US006278437B1

(12) United States Patent
Iga et al.

(10) Patent No.: US 6,278,437 B1
(45) Date of Patent: *Aug. 21, 2001

(54) LIQUID CRYSTAL DISPLAY APPARATUS

(75) Inventors: Tomoyoshi Iga, Tottori; Takeshi Inoue, Tottori-Ken; Shingo Togawa; Kiyoji Inoue, both of Tottori, all of (JP)

(73) Assignees: Sanyo Electric Co., Ltd., Osaka; Tottori Sanyo Electric Co., Ltd., Tottori, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,513

(22) Filed: Dec. 23, 1997

(30) Foreign Application Priority Data

Dec. 24, 1996 (JP) ... 8-343714
Apr. 9, 1997 (JP) ... 9-090610

(51) Int. Cl.[7] ... G09G 5/10; H04N 1/40

(52) U.S. Cl. ... 345/149; 345/147; 345/89; 358/455; 358/457

(58) Field of Search ... 345/89, 147–149; 358/455, 457

(56) References Cited

U.S. PATENT DOCUMENTS

| | | | | |
|---|---|---|---|---|
| 5,293,159 | * | 3/1994 | Bassetti, Jr. et al. | 345/149 |
| 5,389,948 | * | 2/1995 | Liu | 345/147 |
| 5,488,385 | * | 1/1996 | Sanghai | 345/3 |
| 5,548,305 | * | 8/1996 | Rupei | 345/149 |
| 5,598,184 | * | 1/1997 | Barkans | 345/149 |
| 5,712,657 | * | 1/1998 | Eglit et al. | 345/149 |
| 5,757,347 | * | 5/1998 | Han | 345/88 |
| 5,805,126 | * | 9/1998 | Bassetti | 345/89 |
| 5,812,149 | * | 9/1998 | Kawasaki et al. | 345/516 |
| 5,835,117 | * | 11/1998 | Small | 358/455 |

FOREIGN PATENT DOCUMENTS

H7-191630 7/1995 (JP) .

* cited by examiner

*Primary Examiner*—Richard Hjerpe
*Assistant Examiner*—Duc Q. Dinh
(74) *Attorney, Agent, or Firm*—McDermott, Will & Emery

(57) ABSTRACT

An LCD apparatus, when fed with images in a video format whose pixel configuration is smaller than that of the LCD screen, fills the resulting blank area with a particular color through simple and low-speed image data processing. This LCD apparatus has rewritable memories, 24-bit latch circuits that cooperate with a blue-fill circuit and a black-fill circuit to write data of a particular color to the memories at all the addresses corresponding to the LCD screen, an overwriter for overwriting the memories with input image data only at the addresses corresponding to the area of the LCD screen in which images are displayed, and a reader for reading all the data stored in the memories to feed it to an LCD module.

3 Claims, 19 Drawing Sheets

LIQUID CRYSTAL DISPLAY APPARATUS

BACKGROUND OF THE INVENTION

1. Field of the Invention

The present invention relates to an LCD (liquid crystal display) apparatus, and more particularly to an LCD apparatus that can display images in different video formats of different sizes (pixel configurations).

2. Description of the Prior Art

LCD panels are available in different pixel configurations for different video formats such as XGA, SVGA, and VGA. The numbers of columns and rows of pixels that these LCD panels can display are as follows:

| | |
|---|---|
| XGA | 1,024 × 768 pixels |
| SVGA | 800 × 600 pixels |
| VGA | 640 × 480 pixels |

On the other hand, images to be displayed on an LCD panel are generally produced on a personal computer, which can output images in any of XGA, SVGA, and VGA formats depending on the video mode in which it is operating. This means that the pixel configuration of the LCD panel does not always agree with that of the video format in which the LCD panel receives images. For example, this happens when an XGA-type LCD panel receives SVGA- or VGA-format images, or when an SVGA-type LCD panel receives VGA-format images.

In such cases, a blank area appears on the screen of the LCD panel, and the screen therefore looks unnatural. To avoid this, Japanese Laid-open Patent Application No. H7-191630 discloses a method of filling the blank area with a particular color (e.g. black). Specifically, according to this method, false image data of a particular color is written to the blank area on the LCD panel through high-speed image data processing performed during the blanking intervals of the input video signal, whereas the real image data is written to the image area at the normal speed. As a result, a background of that particular color is displayed around the image area.

However, in this conventional method, the blank area needs to be filled with the particular color anew every time the screen (i.e. frame) is refreshed. This wastes processing time, requires high-speed processing, and therefore necessitates extremely efficient circuitry. In particular, this conventional method is especially disadvantageous in that it requires the dot clock to be switched in the middle of scanning between a high-speed dot clock for the blank area and a normal-speed dot clock for the image area. In addition, conventional LCD apparatus generally suffer from noticeable flickers in displayed images.

SUMMARY OF THE INVENTION

An object of the present invention is to provide an LCD apparatus that, even when fed with images in a video format whose pixel configuration is smaller than that of the LCD screen, can fill the resulting blank area with a particular color through simpler and lower-speed image data processing than ever.

Another object of the present invention is to provide an LCD apparatus that can display images without noticeable flickers.

To achieve the above objects, according to one aspect the present invention, an LCD apparatus in which a blank area that appears on an LCD screen of the LCD apparatus as a result of displaying a screen smaller than the LCD screen is displayed in a particular color is provided with a rewritable memory; filling means for writing data of the particular color to the rewritable memory at all addresses corresponding to the LCD screen; overwriting means for overwriting the rewritable memory with image data only at addresses corresponding to the smaller screen: and means for reading all data stored in the rewritable memory and for feeding that data to an LCD module of the LCD apparatus.

In this construction, once data of a particular color is written to the memory in such a way that the entire screen of the LCD module is filled with that color, thereafter it is only necessary to refresh the data in the memory in accordance with input image data. Accordingly, it is not necessary to rewrite the entire screen including blank areas every time the screen (frame) is refreshed.

According to another aspect of the present invention, in the LCD apparatus described above, the smaller screen displayed within the LCD screen has different sizes in different video modes, and the filling means writes data of the particular color to the rewritable memory only once when the video modes are switched. When the video mode is switched from a mode for displaying SVGA-format images on an XGA-type LCD panel to a mode for displaying VGA-format images on the same LCD panel, the image area becomes smaller. As a result, an SVGA-format image may remain displayed around the new image area. However, in the above construction, since the entire screen is filled with a particular color anew on such an occasion, any image remaining at that moment is also overwritten by the filling, and thus no image of the previous video mode remains displayed.

According to another aspect of the present invention, an LCD apparatus in which an image created for a screen smaller in size than an LCD screen of the LCD apparatus is displayed with enlargement is provided with a rewritable memory; a latch circuit for latching input image data and for outputting a predetermined number of bits of the latched image data at a time; a latch control circuit for making the latch circuit latch the input image data in such a way that the input image data is duplicated partially in accordance with a given enlargement factor; a write control circuit for writing image data outputted from the latch circuit to the rewritable memory; and means for reading the image data written to the rewritable memory and feeding that data to an LCD module of the LCD apparatus.

In this construction, displayed images can be enlarged in the horizontal direction simply by making latch circuits latch input image data in such a way that the image data for one line (row of pixels) is uniformly distributed over the actual number of pixels in a line. Thus, enlargement of displayed images can be achieved easily.

According to another aspect of the present invention, an LCD apparatus is provided with a pattern generating circuit for generating a dithering pattern for each of a plurality of shades of color in such a way that the dithering pattern is changed every time an LCD screen of the LCD apparatus is refreshed; a detecting circuit for detecting a shade of color of input image data; and a selecting circuit for selecting, in accordance with an output of the detecting circuit, one of dithering patterns generated by the pattern generating circuit. In addition, in this LCD apparatus, images are displayed on the LCD screen by use of a dithering pattern selected by the selecting circuit.

In this construction, picture-by-picture output of dithering patterns can be easily performed in accordance with the shades of color of input image data.

According to another aspect of the present invention, in the LCD apparatus described above, the LCD screen is refreshed every ½f second, where f represents a vertical frequency of an input video signal. In this construction, flickers on the screen are less noticeable.

According to another aspect of the present invention, in the LCD apparatus described above, the changing of the dithering pattern is achieved by shifting the dithering pattern a predetermined number of bits upward or downward every time the LCD screen of the LCD apparatus is refreshed. In this construction, the picture-by-picture change of a dithering pattern is achieved by the use of regularly recurring patterns.

According to a further aspect of the present invention, display on the LCD panel is temporarily kept turned off during an operation for setting a video mode. In this construction, disturbance of displayed images can be prevented.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 3:
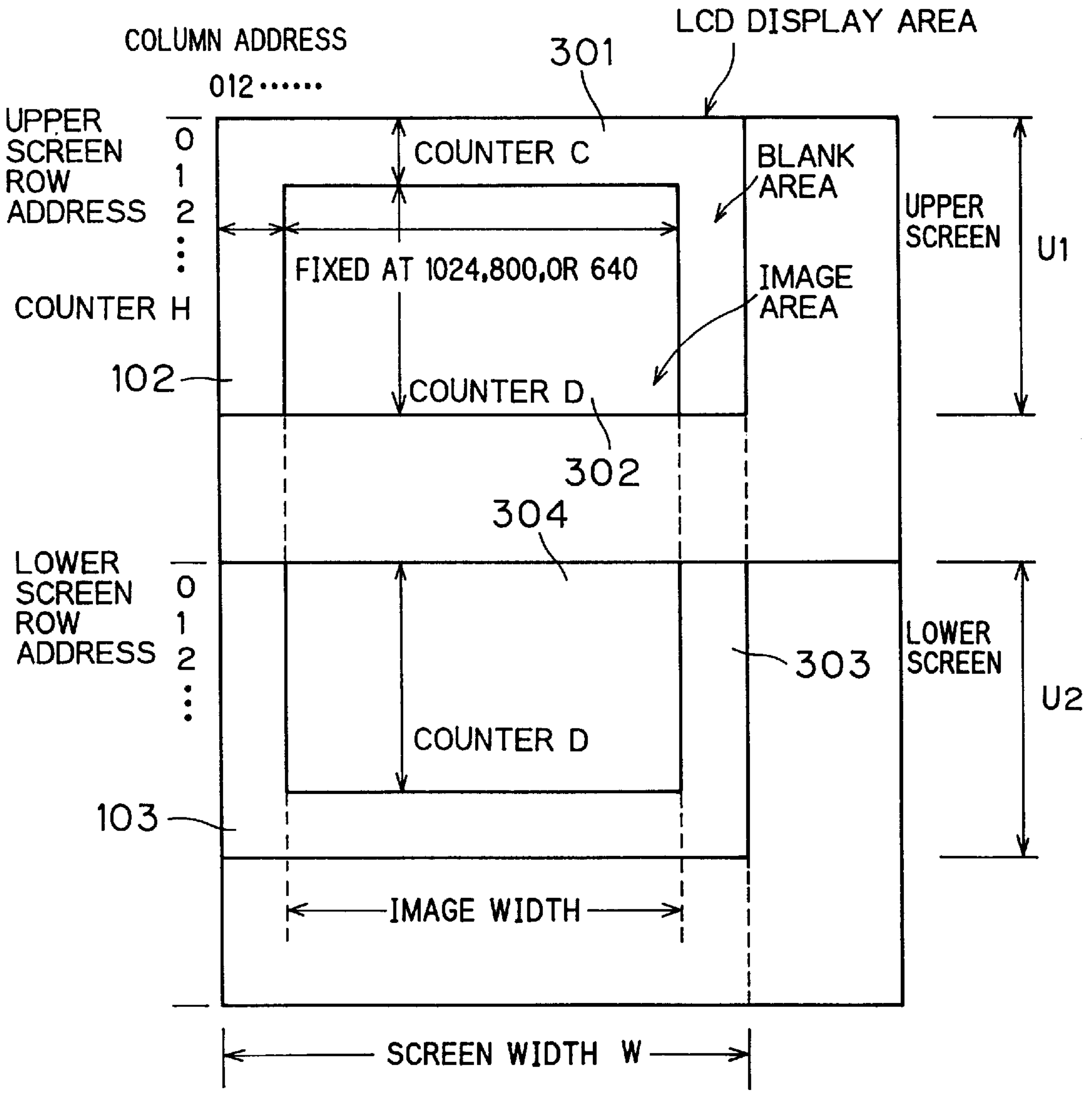
FIG. 3 is a diagram showing the relationship between the contents of the DRAM and the display area on the screen of the LCD apparatus.

FIG. 3 schematically shows the contents of a DRAM (dynamic random access memory) that is used for processing and temporarily storing input image data. Note that, since the locations of addresses in this figure correspond well to the physical locations of pixels on the screen of an LCD panel, this figure will be referred to as representing the LCD screen itself in some portions of the following descriptions to make explanations simpler.

Now, assume that FIG. 3 shows the screen of an XGA-type LCD panel which consists of an upper screen 102 and a lower screen 103 of equal size. Then, the screen has, in each of its upper and lower screens 102 and 103, a display range 1,024-pixels wide (W columns of pixels) and 384-pixels high (U1 and U2 rows of pixels).

When the LCD panel reproduces images from a video signal it receives, it uses the $V_{SYNC}$ (vertical synchronizing signal) pulses included in the video signal to refresh the screen in synchronism with those $V_{SYNC}$ pulses. On the other hand, since how the LCD panel reads the DRAM depends on how many rows of pixels it can display, it does not use the $H_{SYNC}$ (horizontal synchronizing signal) pulses included in the video signal, but produces $H_{SYNS}$ pulses and line-feed signals within itself, in a controller 2 (described later) provided in it.

Figure 4:
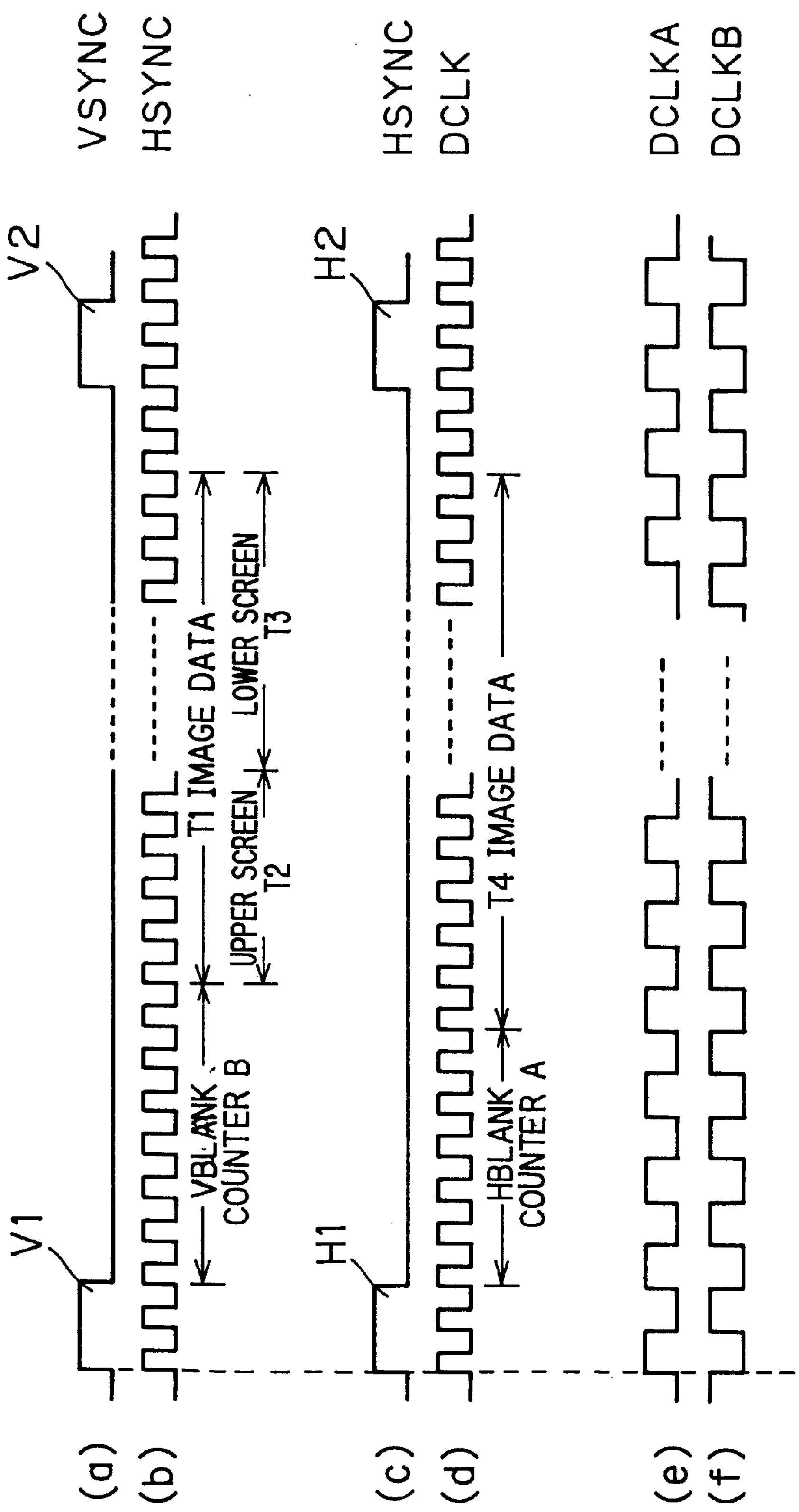
FIG. 4 is a diagram showing the waveforms of the synchronizing signals included in the video signal fed to the LCD apparatus and of related signals.

Specifically, as shown in FIG. 4, the LCD panel, which is here assumed to be an XGA-type LCD panel having 768 rows of pixels, divides the period of every field of the input video signal (i.e. the period from the rising edge of a $V_{SYNC}$ pulse V1 to the rising edge of the next V2) into 768 equal portions to produce $H_{SYNC}$ pulses (FIG. 4(*c*)), and uses the produced pulses to read and display the image data stored in the DRAM. By contrast, when the LCD panel writes image data to the DRAM, it uses the $V_{SYNC}$ and $H_{SYNC}$ pulses shown at (a) to (d) in FIG. 4 intact.

Image data is written to the DRAM as follows. The input video signal contains vertical blanking intervals, during which time no image signal is present (only the synchronizing signals are present). As shown at (a) and (b) in FIG. 4, image signals are present only during the period T1. Accordingly, first, a predetermined number of $H_{SYNC}$ pulses are counted starting with the trailing edge of the $V_{SYNC}$ pulse V1 by the use of a counter B provided in a CPU 1 or in the controller 2. And then, the image data for rows 0, 1, 2, . . . is written to the DRAM, until the entire image data for the 768 rows corresponding to the period T1 is written to the DRAM in such a way that the first half of the image data corresponding to the period T2 is allotted to the upper screen and the second half corresponding to the period T3 is allotted to the lower screen.

Further, the LCD panel produces a dot clock that is in synchronism with the using edges of the $H_{SYNC}$ pulses included in the input video signal. The dot clock has different frequencies depending on which video mode, XGA, SVGA, or VGA, is used. The relationship between the $H_{SYNC}$ pulses and the dot clock thus produced is shown at (c) and (d) in FIG. 4. The dot clock is produced with reference to the rising edge of an $H_{SYNC}$ pulse. Specifically, as shown in FIG. 4, the first pulse of the dot clock is produced when an $H_{SYNC}$ pulse H1 rises, and thereafter the following pulses of the dot clock are produced successively at predetermined intervals. In addition, the dot clock is divided by a factor of two to produce a pulse signal DCLKA as shown at (e) in FIG. 4 and, as its inverted counterpart, a pulse signal DCLKB as shown at (f) in FIG. 4.

The input video signal contains, as well as the vertical blanking intervals mentioned above, also horizontal blanking intervals. In the case of an XGA-format video signal, the horizontal blanking intervals are detected by counting 7 pulses in the dot clock starting with the trailing edge of an $H_{SYNC}$ pulse by the use of another counter A. Then, during the period T4, starting with the seventh pulse of the dot clock, the image data for columns 0, 1, 2, . . . is written to the DRAM.

The relationship between the screen of the LCD panel and an input video signal carrying XGA-format image data is shown in FIG. 3. The image data carried during the period T4 is displayed along a horizontal line (a row of pixels) on the screen, within its width (W columns). The image data carried during the period T2 is displayed in the upper screen U1, and the image data carried during the period T3 is displayed in the lower screen U2. It is to be understood that SVGA- or VGA-format image data can be handled by an SVGA- or VGA-type LCD panel, respectively, exactly in the same manner as XGA-format image data is handled by an XGA-type LCD panel as described above, except that the values of W, U1, and U2, and the number of pixels composing a screenful of image data are different in each case.

However, when fed with images in a format whose pixel configuration is smaller than that of the LCD screen, the LCD panel displays the images in the following manner. Here, it is assumed that SVGA-format image data is fed to an XGA-type LCD panel, for example. First, as shown in FIG. 4, a predetermined number of $H_{SYNC}$ pulses in the input video signal are counted starting with the trailing edge of a $V_{SYNC}$ pulse by the counter B, and then a predetermined number of pulses in the dot clock are counted starting with the trailing edge of an $H_{SYNC}$ pulse by the counter A. Next, sampling of the image data is started, and then writing of the image data to the DRAM is started at the address indicated by counters C and H. That is, when the LCD panel is fed with image data in a format whose pixel configuration is the same as that of the LCD screen, writing of the image data is started at the top address of the DRAM (from row 0, column 0), whereas, when the LCD panel is fed with image data in a format whose pixel configuration is smaller than that of the LCD screen, writing of the image data is started at the row indicated by the counter C and at the column indicated by the counter H.

Thereafter, the image data is written to the DRAM sequentially pixel by pixel and row by row, by the use of the counters H and A and the dot clock, until a screenful of image data is written to the DRAM. The following screenfuls of image data are processed in the same manner. When reading the image data thus written to the DRAM, the LCD panel uses the $H_{SYNC}$ pulses and the line-feed signals that are produced within itself for that purpose.

As described above, when SVGA-format images are displayed on an XGA-type LCD panel, the images are usually displayed at the center of the screen of the LCD panel. As a result, as shown in FIG. 3, only the areas 302 and 304 of the upper and lower screens are used to display the images, and the areas 301 and 303 are left blank. These blank areas may be left unused, but, if they are filled uniformly with black or blue color, the screen will be less eye-straining. Alternatively, if the images to be displayed in the image areas 302 and 304 are enlarged so as to be displayed over the entire XGA screen, there will be no blank area left, and thus the images can be viewed without unnaturalness.

Figure 1:
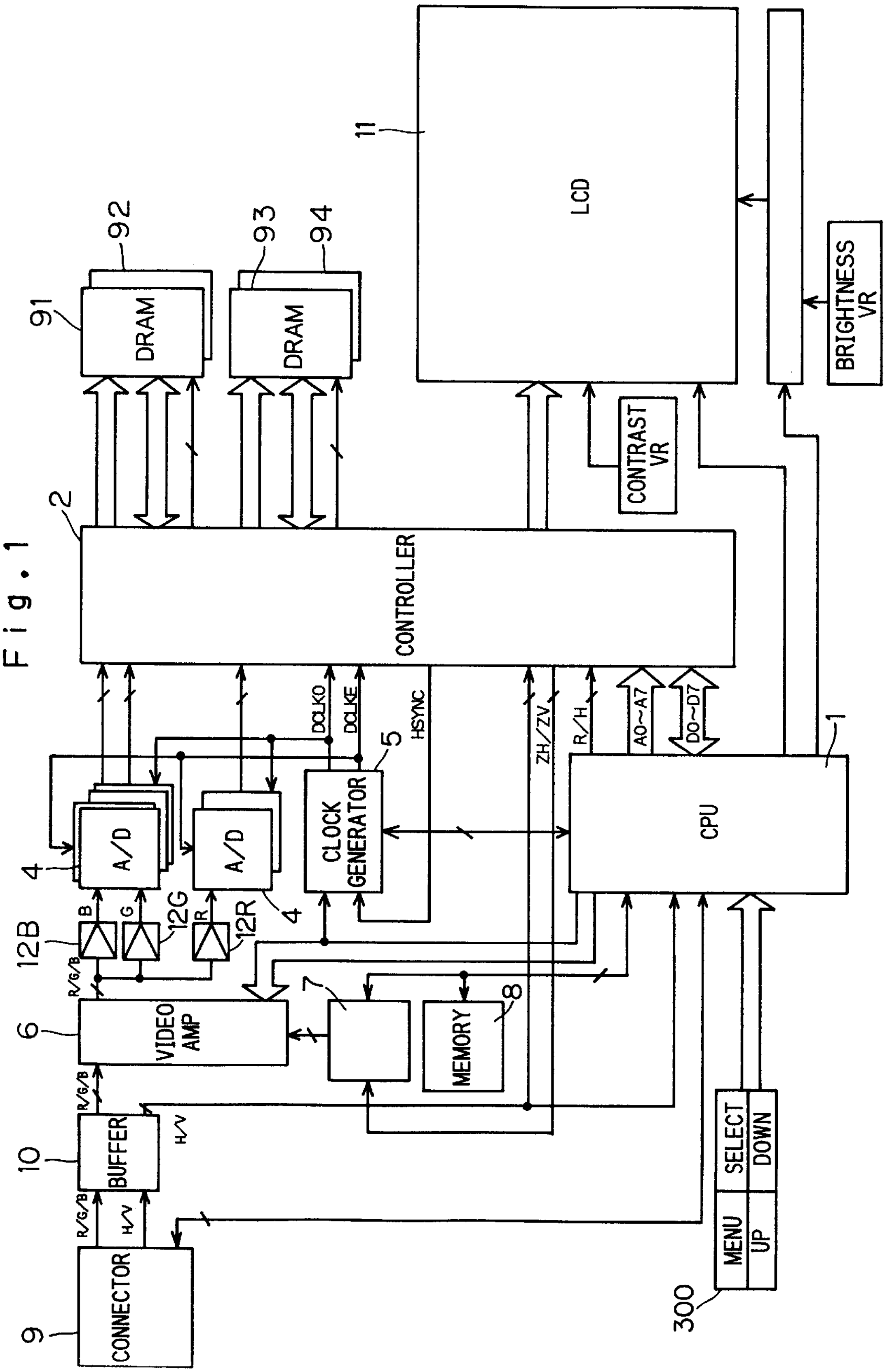
FIG. 1 is a block diagram of an LCD apparatus embodying the present invention.

Hereinafter, an embodiment of the present invention will be described in detail with reference to the drawings. FIG. 1 is a block diagram of an LCD apparatus of a multiscanning type embodying the present invention. This LCD apparatus can operate in one of XGA-, SVGA-, and VGA-format video modes, and can fill the background with a particular color or enlarge images when SVGA- or VGA-format images are displayed.

Numeral 1 represents a CPU for controlling the entire LCD apparatus. Numeral 2 represents a controller for controlling DRAMs and the LCD screen; specifically, it controls shades of color, display position, blank area filling, and others in accordance with the format of the input video signal. This controller 2 is typically composed of gate arrays, though it may be configured differently.

Numerals 91 to 94 are DRAMs for temporarily storing four screenfuls of image data in total. Of these DRAMs 91 to 94, the DRAMs 91 and 93 are for a principal picture, and the DRAMs 92 and 94 are for an auxiliary picture. Numeral 4 represents A/D (analog-to-digital) converters for converting analog signals into digital signals. Here, six A/D converters are provided so that the R, G, and B signals in the input video signal can be processed separately and, for each signal, odd-numbered and even-numbered pixels can be processed separately.

Numeral 5 represents a clock generator for generating a sampling clock fit for the format of the input video signal. Numeral 6 represents a video amplifier for amplifying the input video signal. Numeral 7 represents an on-screen message display circuit for displaying messages on the screen to guide the user in screen adjustments. Numeral 8 represents a non-volatile memory for storing various display parameters. Numeral 11 represents an LCD module. Numeral 300 represents an operation unit provided with display menu keys and others; the output of the operation unit 300 is fed to the CPU 1.

The LCD apparatus of FIG. 1 receives image signals (R, G, and B signals) and vertical and horizontal synchronizing signals $V_{SYNC}$ and $H_{SYNC}$ from an external device (e.g. a personal computer) through a connector 9. Then, the image signals are fed through a buffer 10 to the video amplifier 6, and the synchronizing signals are fed through the buffer 10 to the CPU1 and to the controller 2. The $H_{SYNC}$ and $V_{SYNC}$ signals fed from a personal computer have inconsistent polarities depending on the video mode, such as XGA, SVGA, and VGA, in which the personal computer is operating.

However, since the LCD apparatus does not operate properly unless the $H_{SYNC}$ and $V_{SYNC}$ signals have consistent polarities, the $H_{SYNC}$ and $V_{SYNC}$ signals fed to the controller 2 are processed by the CPU 1 to have consistent polarities. Moreover,the CPU 1 detects the polarities and frequencies of the $H_{SYNC}$ and $V_{SYNC}$ signals, and compares them with the display parameters stored in the non-volatile memory 8 in order to determine what video mode (XGA, SVGA, or VGA) to use and to set parameters in the controller 2 and in the clock generator 5. In accordance with the thus set parameters, the clock generator 5 generates a sampling clock in synchronism with the $H_{SYNC}$ signal, and supplies it to the controller 2 and to the A/D converters 4.

On the other hand, the image signals fed to the video amplifier 6 are, after being adjusted to adequate levels, fed through impedance-matching amplifiers 12R, 12G, and 12B to the A/D converters 4. Then, the A/D converters 4 sample those signals by the use of the sampling clock to convert them into digital signals, which are fed to the controller 2. Meanwhile, to reduce the maximum frequency of the sampling clock, two A/D converters are used for each of the R, G, and B signals so that odd-numbered and even-numbered pixels will be processed separately. Specifically, one A/D converter samples the signal only at the rising edges of the pulse signal obtained by dividing the sampling clock by a factor of 2, and the other A/D converter samples the signal only at the rising edges of the pulse signal having the opposite polarity, so that the signal is outputted as a pair of parallel signals representing odd-numbered and even-numbered bits respectively.

The controller 2, by controlling the vertical and horizontal blanking periods in accordance with the display parameters, takes in the image data, and then, after controlling shades of color, writes the image data to the DRAMs 91 to 94, at the addresses determined in accordance with the video mode. At this time, whether the first bit falls on an odd-numbered or even-numbered bit is determined in accordance with the number of the horizontal blanking intervals.

Shades of color are controlled by the use of ½-, ⅓-, ⅕-, and ⅐-period counters, which determine whether to turn on each pixel or not in accordance with the levels of the image signals. In addition, a combination of a frame counter and a line counter is used to achieve area-based control of shades of color so that no inconsistencies in shades of color will be caused by the frame-by-frame change of the positions at which the pixels are turned on.

Moreover, to reduce flickers and thereby enhance the display quality, the image data for each pixel is created doubly, that is, for two pictures (referred to as the "principal picture" and "auxiliary picture" in the present specification), and these two sets of image data are simultaneously written to the corresponding DRAMs. Thus, two screeinfuls of image data are displayed during the period of one frame. Note that, in the present specification, the terms "principal picture" and "auxiliary picture" are used only for the convenience of explanation, that is, these two pictures are equal in status. Specifically, in television, one picture generally lasts for 1/50 second (or 1/60 second); if each picture is made to last for 1/100 second (or 1/120 second), two pictures will be displayed consecutively within 1/50 second (or 1/60 second), and, in the present specification, one of these two consecutive pictures will be referred to as the principal picture, and the other as the auxiliary picture.

Furthermore, when the LCD apparatus is fed with image signals in a format that does not agree with the video mode (XGA, SVGA, or VGA) in which the LCD module 11 is operating, the images are displayed at the center of the screen by, as described earlier, controlling the addresses at which writing of the image data is started by the use of the counters C and H. In this case, the blank area left around the images is filled with a particular color by writing data of black or other color to all addresses of the DRAMs corresponding to the entire screen when the video mode is switched (only once when the video mode is switched).

Thereafter, unless enlargement is requested, writing of the image data to the DRAMs is performed only for the area where the images are displayed (by controlling the addresses in such a way that the images are displayed in the image area). By contrast, reading of the image data from the DRAMs is performed for the entire screen of the LCD module 11. Meanwhile, writing or reading of the image data is performed alternately for the principal and auxiliary pictures by switching the DRAMs accordingly.

Since the LCD module 11 here is of a dual-scan type, it needs to receive the image data for the upper and lower screens simultaneously. To achieve this, when the image data is written to the DRAMs, the addresses are controlled as if the image data for the upper and lower screens were written to the DRAMs simultaneously, and thus the image data for the two screens is read from the DRAMs simultaneously and fed simultaneously to the LCD module 11.

Figure 2:
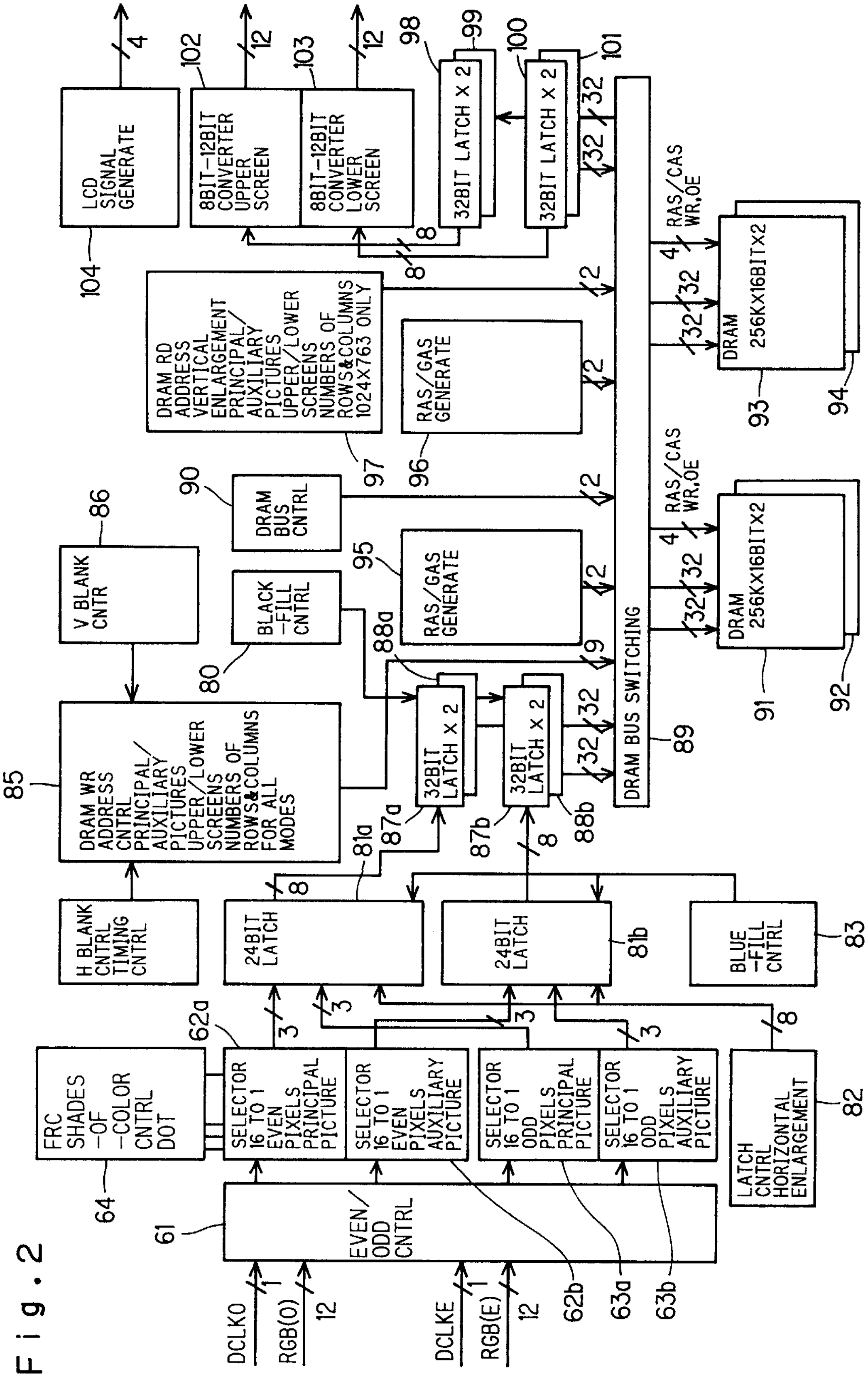
FIG. 2 is a block diagram of the controller of the LCD apparatus.

Next, a detailed description will be given of the controller 2, with which most of the features of the LCD apparatus of the present invention are realized. FIG. 2 is a block diagram of the controller 2. Since the A/D converters 4 cannot keep their outputs stable for a sufficient length of time, all of their 24-bit outputs are first stabilized by latching them by the use of an even/odd control circuit 61. The A/D converters 4 perform A/D conversion regardless of the status of the input image signals, that is, they perform A/D conversion regardless of whether the input image signals represent images or the black level.

The latching operation of the even/odd control circuit 61 is controlled by the CPU 1, which determines, in accordance with the video mode, how many clock pulses the even/odd control circuit 61 should ignore after the trailing edge of a horizontal synchronizing signal $H_{SYNC}$ pulse before starting its latching operation. For example, in FIG. 4, the even/odd control circuit 61 starts its latching (sampling) operation at the seventh clock pulse after the trailing edge of an $H_{SYNC}$ pulse. Since it is impossible at this time to recognize whether the seventh clock pulse corresponds to an even-numbered or odd-numbered pixel, the even/odd control circuit 61 treats the first clock pulse it processes as "A", and the second clock pulse as "B", regardless of whether those pulses really correspond to an even-numbered or odd-numbered pixel.

Figure 10:
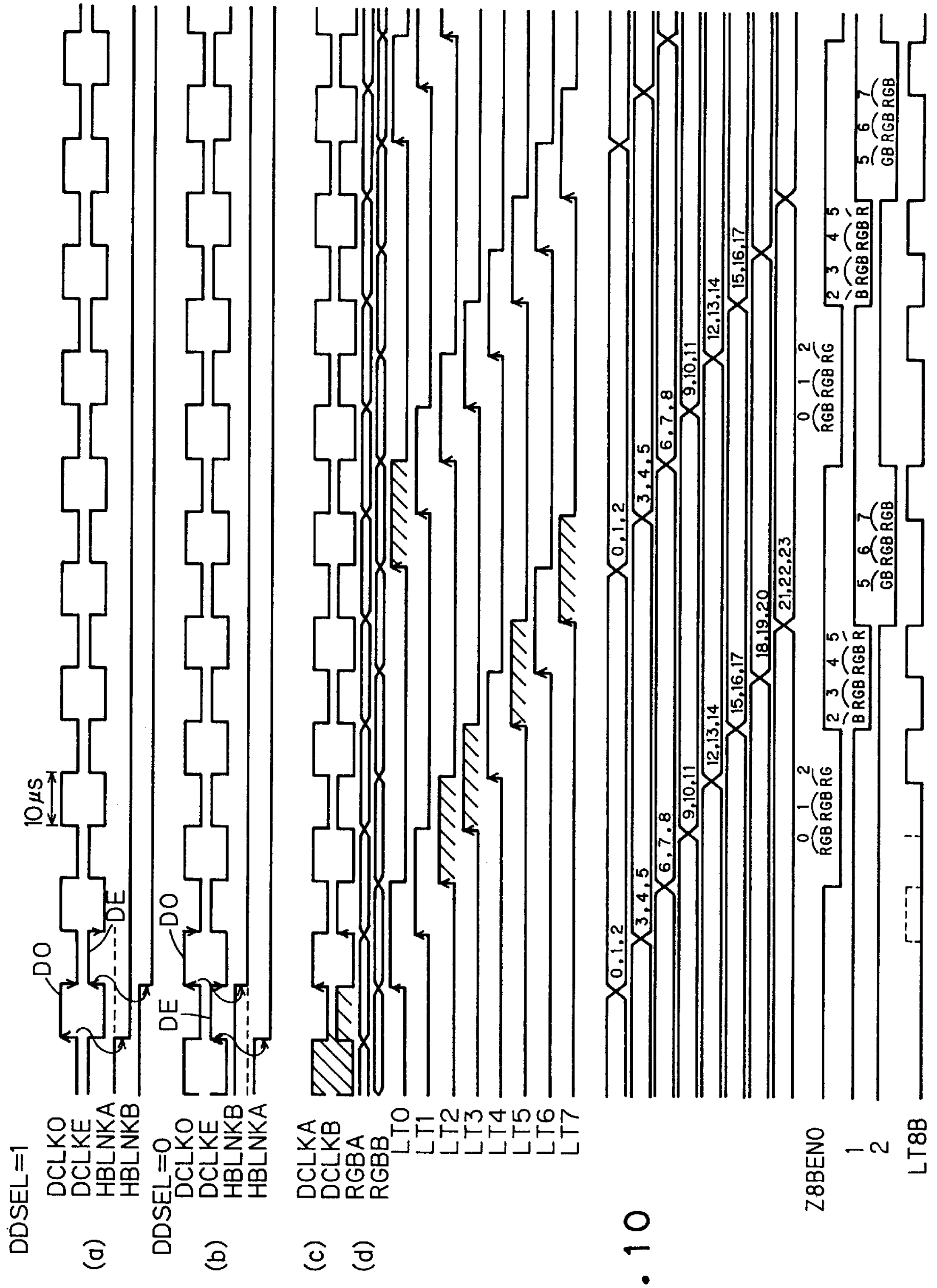
FIG. 10 is a waveform diagram showing how the 24-bit latch circuit operates.

This is illustrated at (c) in FIG. 10. At (a) and (b) in FIG. 10, DCLKO represents the dot clock for odd-numbered pixels, and DCLKE represents the dot clock for even-numbered pixels. In the case shown at (a), a horizontal blanking period HBLNKA for odd-numbered pixels ends at the rising edge of an odd-numbered dot clock pulse $D_O$ that occurs for the n-th time (n represents a predetermined number) after a horizontal synchronizing signal pulse, and a horizontal blanking period HBLNKB for even-numbered pixels ends at the rising edge of an even-numbered dot clock pulse $D_E$ that occurs for the n-th time. Accordingly, in this case, the first dot clock pulse after these two horizontal blanking periods is an even-numbered pulse $D_E$. By contrast, in the case shown at (b), the first dot clock pulse after those two horizontal blanking periods is an odd-numbered pulse.

As described above, the first pulse for the latching operation may be an even-numbered or odd-numbered pulse. In either case, as shown at (c) in FIG. 10, the first pulse is treated as "A" (i.e. DCLKA) and the next pulse is treated as "B" (i.e. DCLKB). Note that, FIG. 10 also shows, at (d), the RGB image data latched by DCLKA and DCLKB; specifically, RGBA represents the image data latched by DCLKA, and RGBB represents the image data latched by DCLKB.

The even/odd control circuit 61 latches 4×3=12 bits for the RGB image data for odd-numbered pixels (4 bits for each of the R, G, and B data) and 4×3=12 bits for the RGB image data for even-numbered pixels, and feeds its latched outputs, together with the dot clocks DCLKA and DCLKB, to selectors *62a*, *62b*, *63a*, and *63b*.

The selector 62a is for the principal picture for even-numbered pixels, and the selector 62b is for the auxiliary picture for even-numbered pixels. The selector 63a is for the principal picture for odd-numbered pixels, and the selector 63b is for the auxiliary picture for odd-numbered pixels. These selectors are each composed of separate selectors for the R, G, and B data, and these separate selectors each receive via their input terminals a corresponding four-bit image signal. On the other hand, an FRC circuit 64 generates 16 dithering patterns for each of the R, G, and B data, and its outputs are fed to the selectors 62a, 62b, 63a, and 63b through 16 signal lines. The selectors 62a, 62b, 63a, and 63b select one of those 16 dithering patterns in accordance with the levels of the image signals (i.e. in accordance with the shades of color).

Figure 5:
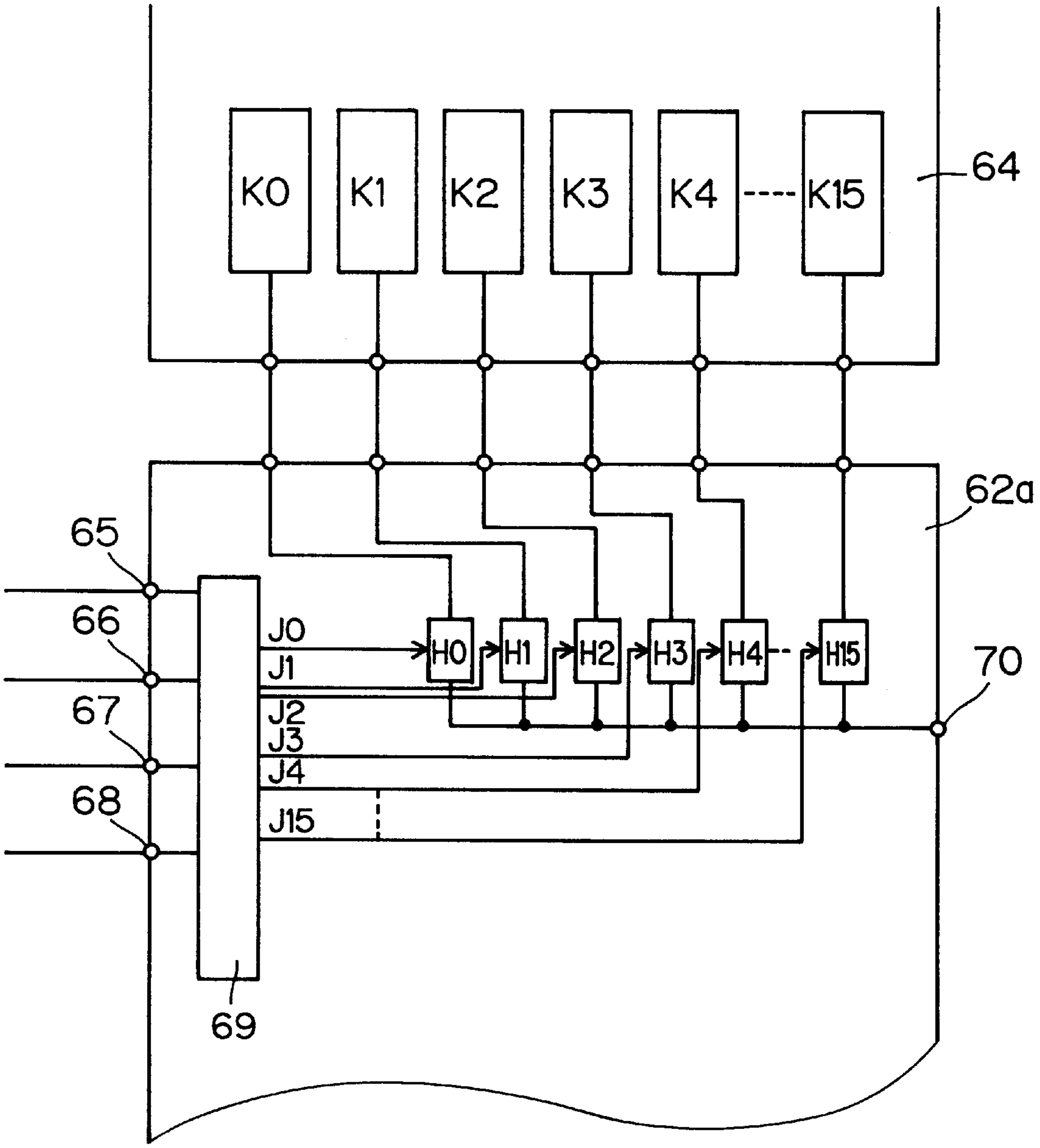
FIG. 5 is a diagram showing the dithering pattern generating circuit and the selector shown in FIG. 2.

The FRC circuit 64 controls shades of color before it feeds dithering patterns to the selectors 62a, 62b, 63a, and 63b. This is performed, for the R data of the RGB image data for example, as follows. The FRC circuit 64 receives not only the image data including the R data, but also the $H_{SYNC}$ and $V_{SYNC}$ pulses and the dot clocks. As shown in FIG. 5, the FRC circuit 64 has 16 pattern generating circuits K0, K1, . . . K15 for generating dithering patterns. Since the R data consists of 4 bits, 16 shades of color can be distinguished.

The pattern generating circuit K0 generates a dithering pattern that corresponds to "0000", K1 generates one that corresponds to "0001", . . . and K15 generates one that corresponds to "1111". Note that the pattern generated by K0 keeps all the pixels over the entire LCD screen off all the time, whereas the pattern generated by K15 keeps all the pixels over the entire LCD screen on all the time.

Figure 6A:
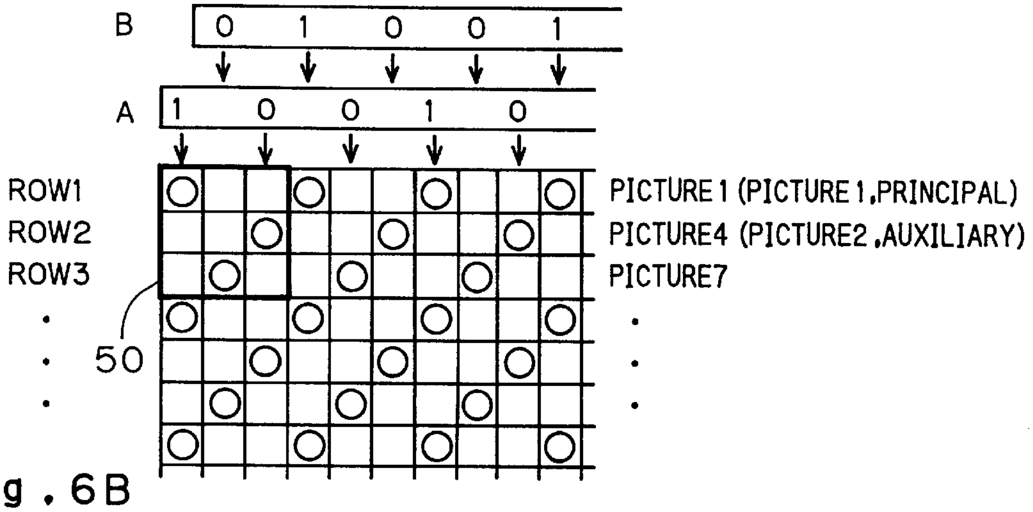
FIGS. 6A to 6C are diagrams showing an example of the dithering patterns.
Figure 6B:
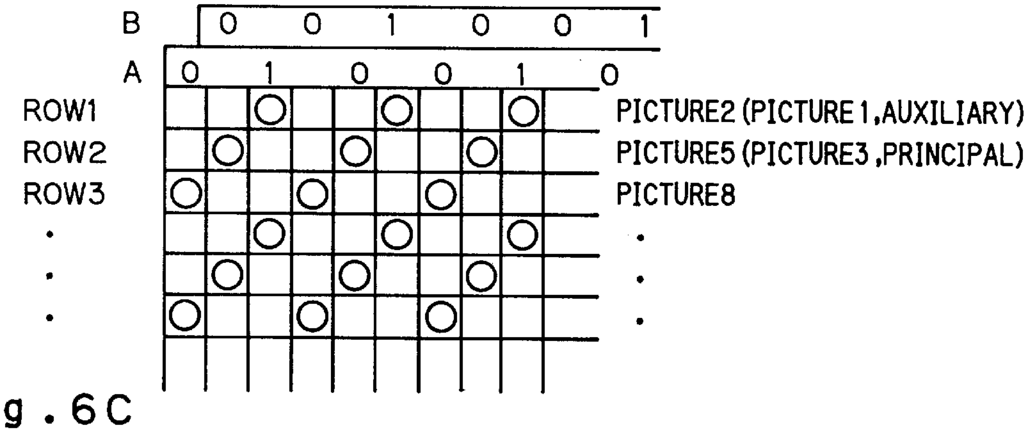
Figure 6C:
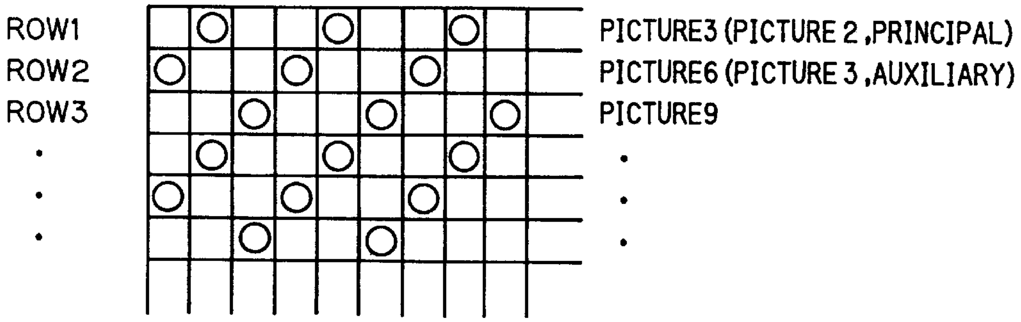

FIGS. 6A to 6C show the pattern generated by the pattern generating circuit K4. Note that, in the embodiment under discussion, two screenfuls of image data (referred to as the "principal picture" and "auxiliary picture" in the present specification) are displayed every 1/60 second. In other words, the LCD screen is refreshed 120 times per second. Accordingly, in the following description, an n-th picture (n=1, 2, . . .) denotes one of those pictures that are each displayed for 1/120 second.

In FIG. 6A, there are nine pixels in one block 50, and the dithering pattern of K4 causes three of them (one third of the total number) to be turned on for the input image data A and B. The image data A results from the latching operation based on the dot clock DCLKA, and the image data B results from the latching operation based on the dot clock DCLKB. FIG. 6A shows the principal picture of the first picture, FIG. 6B shows the auxiliary picture of the first picture, and FIG. 6C shows the principal picture of the second picture. Thereafter, the auxiliary picture of the second picture looks as shown in FIG. 6A, the principal picture of the third picture looks as shown in FIG. 6B, and the auxiliary picture of the third picture looks as shown in FIG. 6C. That is, the pictures shown in FIGS. 6A to 6C are displayed sequentially and repeatedly.

As seen from these figures, as the picture changes from that shown in FIG. 6A to that shown in FIG. 6B and then to that shown in FIG. 6C, the pattern of "on" pixels shifts one line (row of pixels) upward at a time. That is, the picture of FIG. 6B is obtained by shifting the "on" pixel pattern of the picture of FIG. 6A one line upward, the picture of FIG. 6C is obtained by shifting the "on" pixel pattern of the picture of FIG. 6B one line upward. Then, the picture of FIG. 6A is obtained again by shifting the "on" pixel pattern of the picture of FIG. 6C one line upward.

The pattern generating circuits K0, K1, . . . , K15 of the FRC circuit 64 each generate a different dithering pattern assigned thereto, and selection of a particular dithering pattern is made by the selectors 62a, 62b, 63a, and 63b. Of the circuitry for achieving this selection, only the portion of the circuit of the selector 62a that deals with the R data is shown in FIG. 5. As noted previously, the R data, which is a part of the RGB image data, consists of 4 bits. The selector 62a receives the R data via its input terminals 65 to 68, and decodes it with a decoder 69.

The outputs of the decoder 69 are individually connected by output lines J0, J1, . . . , J15 to gate circuits H0, H1, . . . , H15. When the input four-bit data is "0000", only the line J0 is "1", so that the gate H0 conducts to output the data from K0 to the output terminal 70 of the selector 62a. When the input data is "0100", the gate H4 conducts to output the data from K4 (i.e. the data that forms the pattern shown in FIGS. 6A to 6C) to the output terminal 70.

Figure 7:
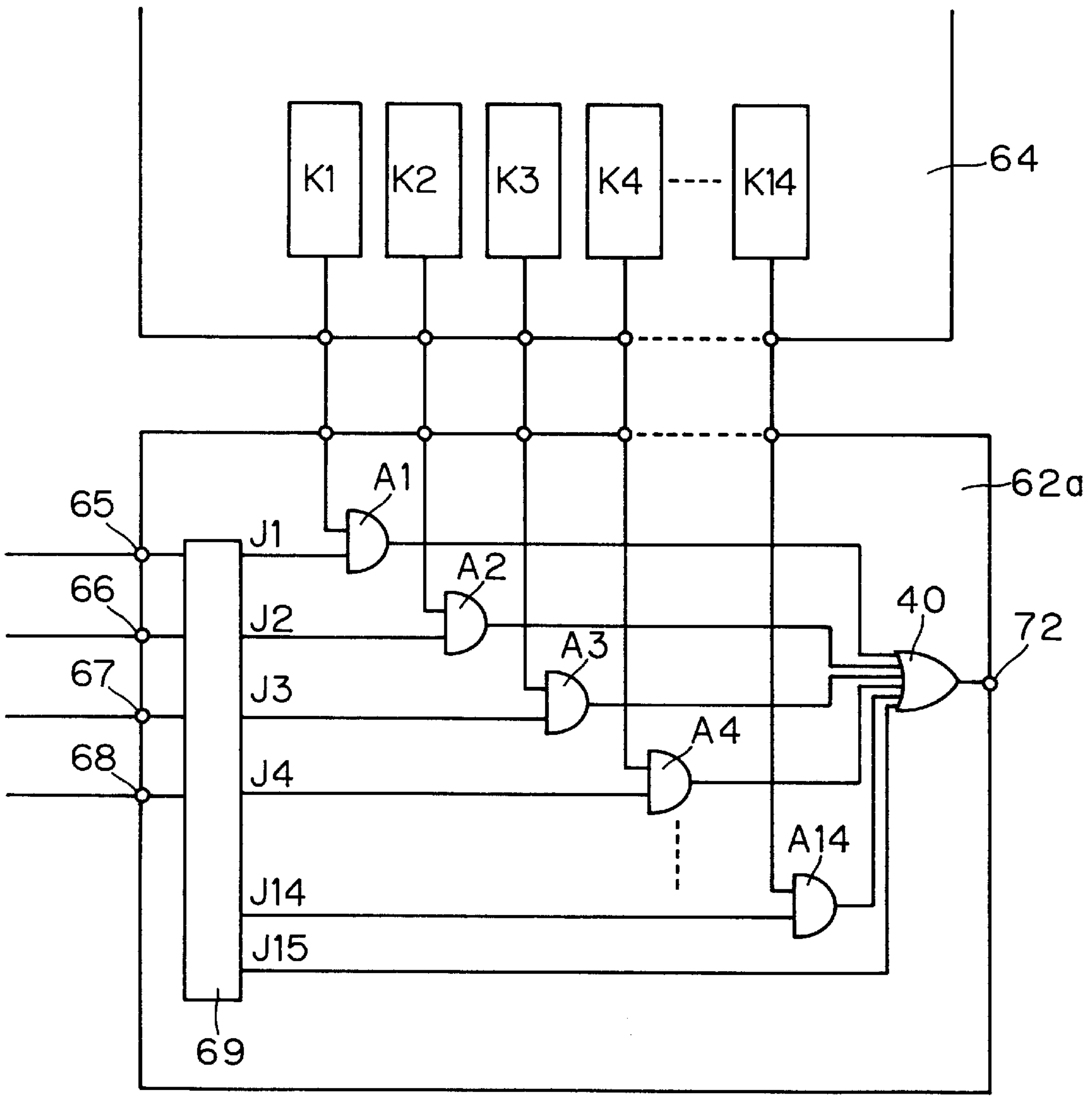
FIG. 7 is a diagram showing a modified example of the dithering pattern generating circuit and the selector.

FIG. 7 shows a modified example of the selector 62a and the FRC circuit 64. In this example, the FRC circuit 64 has the pattern generating circuits K1 to K14, but lacks K0 and K15. In the selector 62a, the decoder 69 has the output lines J1 to J15, but lacks J0. The output line J15 is connected directly to an OR gate 40. The output lines J1 to J14 are individually connected to AND gates A1 to A14, which in turn are individually connected to the pattern generating circuits K1 to K14. The circuit shown in FIG. 7 has an advantage over that shown in FIG. 5 in that the former has a simpler construction than the latter.

Note that in FIG. 5, the pattern generated by KO simply keeps all the bits "0". On the other hand, in FIG. 7, when the four-bit R data fed to the input terminals 65 to 68 is "0000", the output lines J1 to J14 are all "0", causing the OR gate 40 to output "0". Thus, the circuit in FIG. 7, although it lacks the pattern generating circuit K0, can generate the pattern that would be generated by K0.

Similarly, in FIG. 5, the pattern generated by K15 simply keeps all the bits "1". On the other hand, in FIG. 7, when the four-bit R data fed to the input terminals 65 to 68 is "1111", only the output line J15 is "1". Since the output line J15 is connected directly to the OR gate 40, this keeps the output terminal 72 "1". Thus, the circuit in FIG. 7, although it lacks the pattern generating circuit K15, can generate the pattern that would be generated by K15.

Figure 8A:
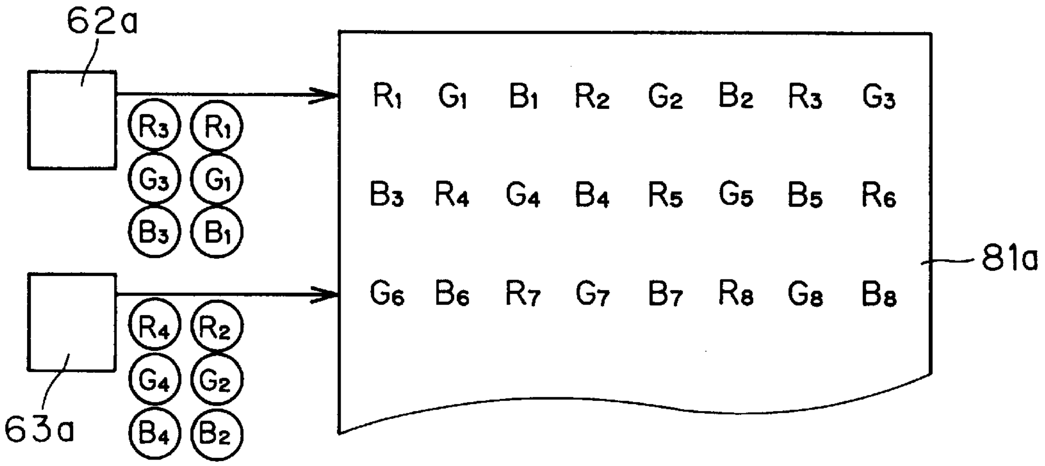
FIGS. 8A and 8B are diagrams showing how the 24-bit latch circuit shown in FIG. 2 operates.
Figure 8B:
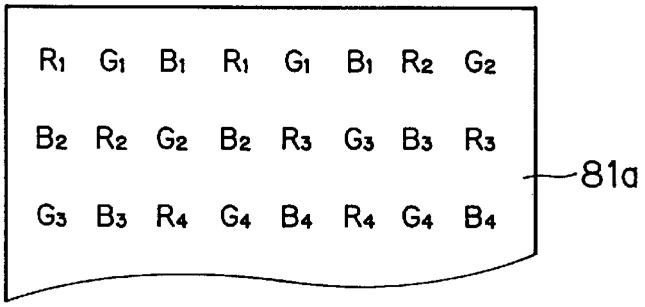

It is to be understood that, in FIG. 2, each of the selectors 62a, 62b, 63a, and 63b has a circuit as shown in FIG. 5 or 7 for each of the R, G, and B data. The outputs of the selectors 62a and 63a are fed to a 24-bit latch circuit 81a, and the outputs of the selectors 62b and 63b are fed to another 24-bit latch circuit 81b. FIGS. 8A and 8B schematically show the latching operation performed by the 24-bit latch circuit 81a for the principal picture to latch the outputs of the selector 62a for the even-numbered pixels on the principal picture and the outputs of the selector 63a for odd-numbered pixels on the principal picture. Note that the subscript numerals attached to the letters R, G, and B representing segments of the RGB image data simply indicate the order of explanation, and therefore they do not indicate that a particular segment of the image data corresponds to an odd-numbered or even-numbered pixel.

The outputs from the selectors 62a and 63a are alternately fed to the 24-bit latch circuit 81a. Specifically, as shown in FIGS. 8A and 8B, the latch circuit 81a receives segments $R_1$, $G_1$, $B_1$, $R_2$, $G_2$, $B_2$, $R_3$, $G_3$, $B_3$, $R_4$, $G_4$, and $B_4$ of the image data in this order. The latch circuit 81a has 24 flip-flops, and latches the input data as shown in FIGS. 8A and 8B. Meanwhile, every time 8 bits are accumulated in the latch circuit 81a, those 8 bits are simultaneously outputted parallel. The selectors 62$b$ and 63$b$ and the latch circuit 81$b$ for the auxiliary picture operate in the same way and at the same time as their counterparts for the principal picture.

Figure 9:
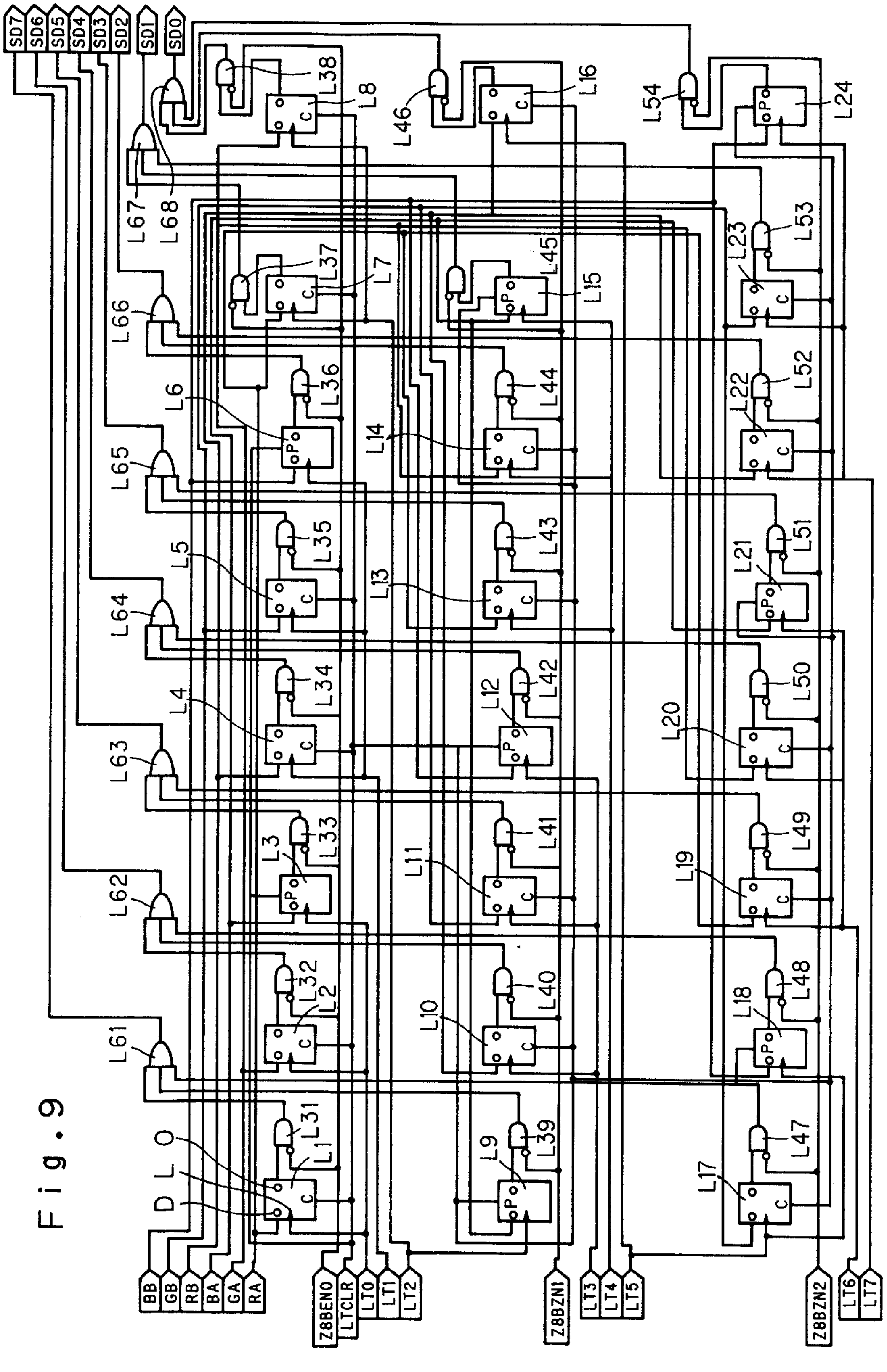
FIG. 9 is a diagram showing the detailed construction of the 24-bit latch circuit.

FIG. 9 shows the detailed construction of each of the 24-bit latch circuits 81$a$ and 81$b$. As shown in FIG. 9, to achieve latching, the 24-bit latch circuit uses 24 D flip-flops L1 to L24 arranged in three rows each consisting of 8 D flip-flops. The outputs of the flip-flops L1 to L24 are delivered through AND gates L31 to L54 and through OR gates L61 to L67 to output terminals SD7 to SD0.

The flip-flops L1, L7, L13, and L19 receive RA at their D terminal, the flip-flops L2, L8, L14, and L20 receive GA at their D terminal, and the flip-flops L3, L9, L15, and L21 receive BA at their D terminal.

On the other hand, the flip-flops L4, L10, L16, and L22 receive RB at their respective D terminal, the flip-flops L5, L11, L17, and L23 receive GB at their respective D terminal, and the flip-flops L6, L12, L18, and L24 receive BB at their respective D terminal. Here, RA, GA, and BA represent the R, G, and B image signals latched by the even/odd control circuit 61 by the use of the dot clock DCLKA, whereas RB, GB, and BB represent the R, G, and B image signals latched by the even/odd control circuit 61 by the use of the dot clock DCLKB.

At their respective clock terminal, the flip-flops L1, L2, and L3 receive a dot clock LT0, the flip-flops L4, L5, and L6 receive a dot clock LT1, the flip-flops L7, L8, and L9 receive a dot clock LT2, the flip-flops L10, L11, and L12 receive a dot clock LT3, the flip-flops L13, L14, and L15 receive a dot clock LT4, the flip-flops L16, L17, and L18 receive a dot clock LT5, the flip-flops L19, L20, and L21 receive a dot clock LT6, and the flip-flops L22, L23, and L24 receive a dot clock LT7. The waveforms of these dot clocks LT0 to LT7 are shown in FIG. 10.

First, on receiving the dot clock LT0, the flip-flops L1, L2, and L3 respectively latch segments $R_1A$, $G_1A$, and $B_1A$ of the input image signals. Next, on receiving the dot clock TL1, the flip-flops L4, L5, and L6 latch segments $R_1B$, $G_1B$, and $B_1B$ of the input image signals. Then, on receiving the dot clock TL2, the flip-flops L7, L8, and L9 latch segments $R_2A$, $G_2A$, and $B_2A$ of the input image signals. In this way, the input image signals are latched sequentially.

Meanwhile, from the rising edge of the dot clock LT2 to the rising edge of LT5, a signal Z8BEN0 for reading the image data is held low, as shown in FIG. 10. This low level of the signal Z8BEN0 is inverted and then fed to the AND gates L31 to L38, causing the AND gates L31 to L38 to conduct. As a result, the image data latched in the flip-flops L1 to L8 is delivered, through the AND gates L31 to L38 and then through the OR gates L61 to L68, to the output terminals SD7 to SD0. This data delivered to the output terminals SD7 to SD0 is then fed to 32-bit latch circuits 87$a$ and 88$a$ (see FIG. 2).

Similarly, from the rising edge of the dot clock LT5 to the rising edge of LT7, another signal Z8BEN1 for reading the image data is held low, and, during that period, the image data latched in the flip-flops L9 to L16 is delivered to the output terminals SD7 to SD0. Further, from the rising edge of the dot clock LT7 to the rising edge of LT2, a third signal Z8BEN2 for reading the image data is held low, and, during that period, the image data latched in the flip-flops L17 to L24 is delivered to the output terminals SD7 to SD0.

The clear signal LTCLR for the flip-flops L1 to L24 is held low throughout the above-described latching operation. Accordingly, the data latched in the flip-flops L1 to L24 is never cleared but refreshed by overwriting. As described earlier and as shown in FIG. 3, when images having the width Z are displayed on a screen having the width W, it is desirable to fill the entire screen (over the width W) with blue color beforehand so that the blank areas 301 and 303 will be displayed in blue color. This filling of the screen with blue color requires that the RGB data be "001", and is processed as follows.

Of the flip-flops L1 to L3, the flip-flops L1 and L2 for R and G data have their clear terminal c connected to the clear signal input terminal LTCLR, but the flip-flop L3 for B data has its preset terminal p connected to the clear signal input terminal LTCLR. Accordingly, the filling of the entire screen with blue color can be achieved by holding the clear signal high. This is because, as long as the clear signal is held high, the flip-flops L1 and L2 invariably output "0" and the flip-flop L3 invariably outputs "1" regardless of the color of the input image data. As seen from FIG. 9, of the flip-flops L1 to L24, those for R and G data, like L1 and L2, have their clear terminal c connected to the clear signal input terminal LTCLR, and those for B data, like L3, have their preset terminal p connected to the clear signal input terminal LTCLR.

Next, a description will be given of the operation performed by the 24-bit latch circuit 81$a$ to enlarge images horizontally. Such enlargement is performed, for example, to enlarge SVGA- or VGA-format images so that they are displayed over the entire screen of an XGA-type LCD panel. To make explanations simple, the latching operation performed by the 24-bit latch circuit 81$a$ when images are enlarged by a factor of two is shown in FIG. 8B, though the embodiment under discussion does not actually use an enlargement factor of two. In this case, enlargement is achieved by latching, for each of the R, G, and B image signals, the three-bit data simultaneously with two flip-flops.

Figure 11:
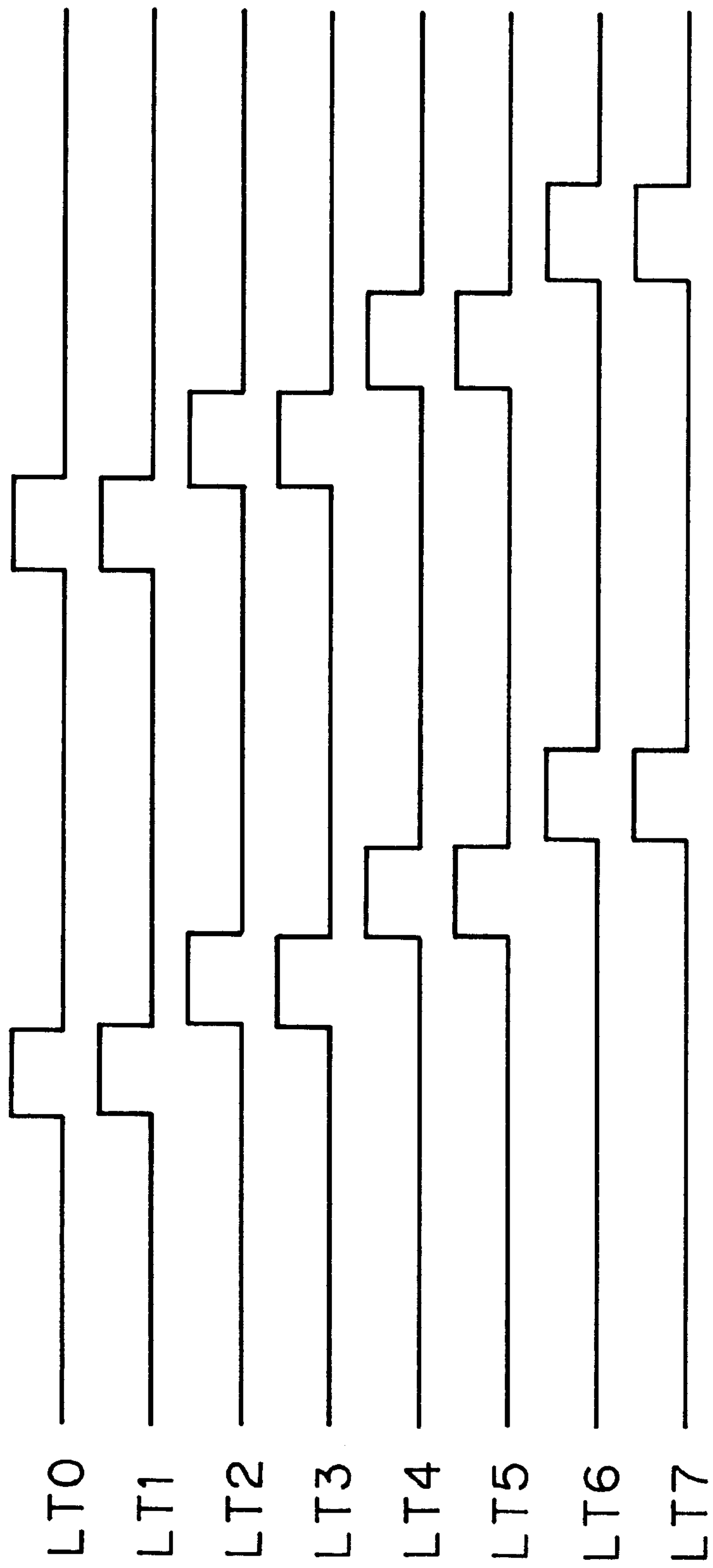
FIG. 11 is a waveform diagram showing the principle of the processing for enlarging images.

Such latching is realized, in FIG. 9, simply by feeding the dot clocks LT0 to LT7 as shown in FIG. 11. In this case, when the flip-flops L1 to L3 operate, the flip-flops L4 to L6 operate simultaneously, for example. That is, each of the three pairs of flip-flops operates simultaneously six times per signal processing cycle. This quickens the writing of image data to the DRAMs through the 32-bit latch circuits.

Figure 12:
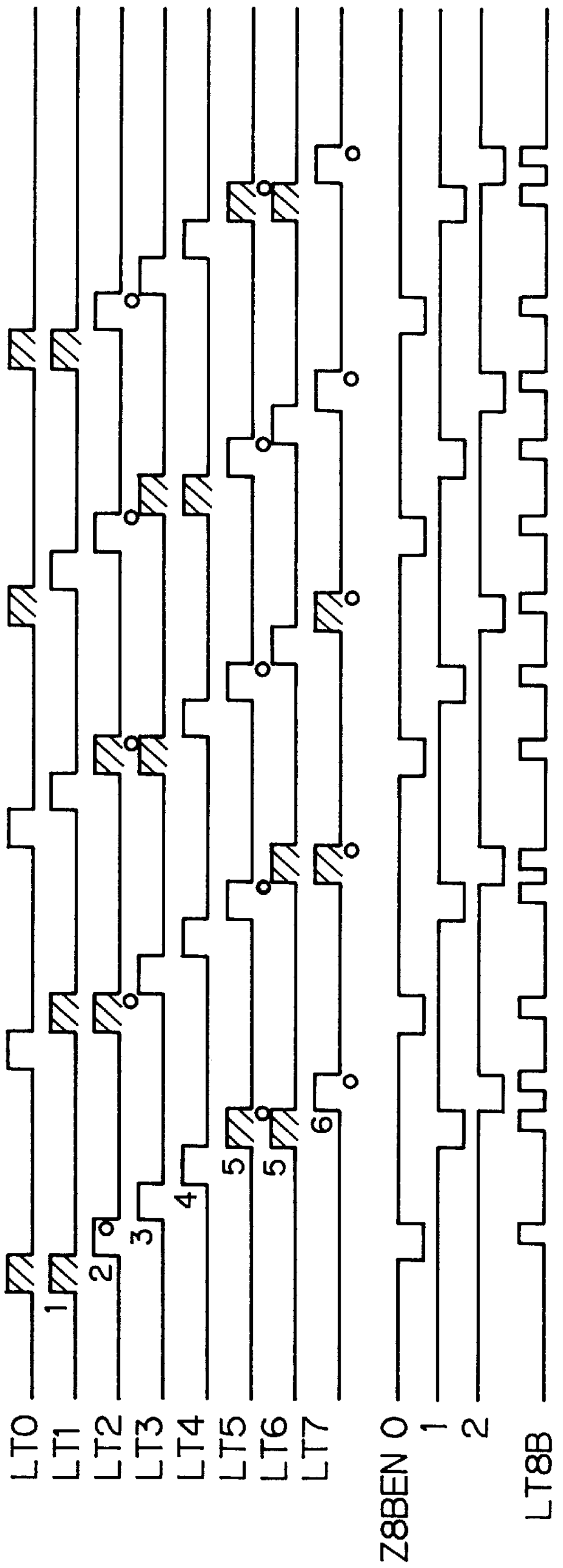
FIG. 12 is a waveform diagram showing an example of the processing for enlarging images by a factor of 1.28.

FIG. 12 shows the dot clocks LT0 to LT7 as supplied to the 24-bit latch circuit 81$a$ when images are enlarged horizontally by a factor of 1.28 (in FIG. 3, images having the width Z are enlarged to have the width W), together with the signals Z8BEN0, Z8BEN1, and Z8BEN2 for reading the image data 8 bits at a time, and another signal. The dot clocks LT0 to LT7 and the read signals Z8BEN0, Z8BEN1, and Z8BEN2 are fed from a latch control circuit 82. Although no details of the latch control circuit 82 are shown in the figures, the latch control circuit 82 generates the dot clocks LT0 to LT7 and the read signals Z8BEN0 to Z8BEN2 as shown in FIGS. 10 and 12 in accordance with the currently selected video mode.

As described earlier, when SVGA-format images (800×600 pixels) or VGA-format images (640×480 pixels) are displayed on the screen of an XGA-type LCD panel (1,024×768 pixels), or when VGA-format images are displayed on the screen of an SVGA-type LCD panel, blank areas 301 and 303 appear around the area in which images are displayed, and therefore filling those blank areas 301 and 303 with blue or black color reduces eye strain. How this is achieved will be described below, taking as an example the case in which 800×600-pixel images are displayed on a 1,024×768-pixel screen.

According to the present invention, in order to fill such blank areas with blue or black color, first, data of blue or black color is once written to those addresses in the DRAMs which correspond to the entire screen (i.e. the entire screen is filled with blue or black color), and thereafter only the data at those addresses in the DRAMs which correspond to the 800×600-pixel area is refreshed with image data. This filling of the entire screen with blue or black color is done when the processing for displaying images is started, and when the video mode is changed (e.g. from the mode for displaying SVGA-format images on the XGA-format screen to the mode for displaying VGA-format images thereon, or vice versa). On the other hand, the reading of the image data from the DRAMs is always done for the entire screen (1,024×768 pixels) every time the screen is refreshed.

Specifically, the writing of blue- or black-color data to the DRAMs (i.e. the filling of the entire screen with blue or black color) is performed as follows. In the horizontal direction, in order to form 1,024 pixels within the time allocated to 800 pixels, the color data for each row of pixels is enlarged. On the other hand, in the vertical direction, in order to achieve the filling of the entire screen, data of blue or black color is written, during the first vertical interval, to that half of the DRAMs which corresponds to the upper half of the screen, and, during the second vertical interval, to that half of the DRAMs which corresponds to the lower half of the screen.

As described previously in connection with FIGS. 9 and 11, image data or color data can be enlarged by controlling the dot clocks LT0 to LT7 appropriately when the data is written to the 24-bit latch circuits. If such enlargement is performed while the clear signal LTCLR for the flip-flops L1 to L24 is kept "1", the 24-bit latch circuits repeatedly latch data corresponding to a pixel "001", and thus outputs blue-color data for the entire screen. This blue-color data is stored in the DRAMs through the 32-bit latch circuits. Thereafter, only the data at those addresses in the DRAMs which correspond to the 800×600-pixel area is refreshed with image data.

Whereas the filling of the screen with blue color is processed by the 24-bit latch circuits, the filling of the screen with black color (i.e. the filling of the area around the 800×600-pixel area with black color) is processed by the 32-bit latch circuits. This is because black-color filling is readily achieved simply by clearing the individual latch circuits constituting the 32-bit latch circuits.

As noted previously, in image data supplied from a personal computer, significant data starts a predetermined number of $H_{SYNC}$ pulses after a $V_{SYNC}$ pulse, and, within one horizontal line, significant data starts a predetermined number of pixels after an $H_{SYNC}$ pulse. This is because the input image data includes vertical and horizontal blanking intervals.

After predetermined vertical and horizontal blanking intervals which are determined by the CPU 1, processing of images is performed as follows. The 24-bit latch control circuit 82 generates latch signals for 24-bit latching operation, and, in synchronism therewith, the 24-bit latch circuits latch the RGB image data three bits at a time. More specifically, the two 24-bit latch circuits 81*a* and 81*b*, one for the principal picture and the other for the auxiliary picture, perform latching operation simultaneously so that each will individually latch the RGB image data sequentially, three bits at a time. FIG. 9 shows the construction of the 24-bit latch circuit 81*a* for the principal picture, and the 24-bit latch circuit 81*b* for the auxiliary picture has the same construction except that it is fed with different parts of the input image data.

The 32-bit latch circuits 87*a*, 88*a*, 87*b*, and 88*b* sequentially latch the 8-bit data fed from the 24-bit latch circuits 81*a* and 81*b*, and, every four latching cycles, that is, every time 32 bits of data are accumulated, a DRAM write address control circuit 85 outputs an address signal so that the image data outputted from the 32-bit latch circuits will be writ ten to the DRAMs 91 to 94.

There are four 32-bit latch circuits, of which two (87*a* and 88*a*) are for the principal picture, and two (87*b* and 88*b*) are for the auxiliary picture. When 32 bits of data are accumulated in each of the latch circuits 87*a* and 87*b*, that data is written to the DRAMs, and meanwhile the other latch circuits 88*a* and 88*b* each accumulate the next 32 bits of data. This sequence of operations is repeated to process the image data sequentially.

Figure 13:
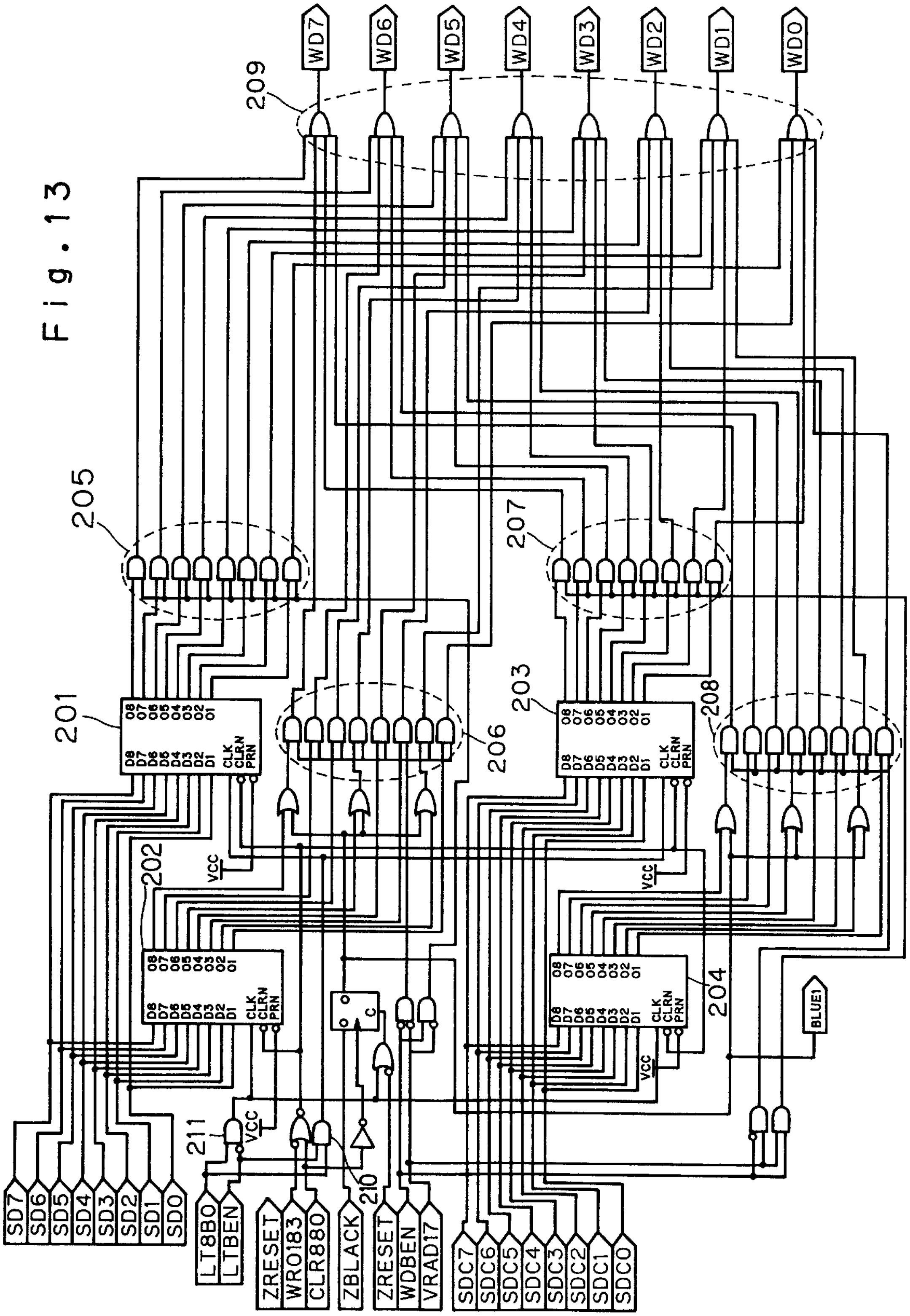
FIG. 13 is a circuit diagram of a portion of the 32-bit latch circuit shown in FIG. 2.

FIG. 13 shows a quarter portion (the portion for processing the first eight bits) of each of the 32-bit latch circuits 87*a*, 88*a*, 87*b*, and 88*b*. In other words, each of the 32-bit latch circuits 87*a*, 88*a*, 87*b*, and 88*b* is composed of four of the circuit shown in FIG. 13. In FIG. 13, numerals 201, 202, 203, and 204 each represent an 8-bit D flip-flop IC.

The 32-bit latch circuit receives image data for the principal picture via its input terminals SD0 to SD7 that are connected to the corresponding output terminals of the 24-bit latch circuit 81*a*, and receives image data for the auxiliary picture via its input terminals SDC0 to SDC7 that are connected to the corresponding output terminals of the 24-bit latch circuit 81*b*. The received image data is processed by the flip-flop ICs 201 to 204, whose outputs are delivered, through AND-gate groups 205 to 208 and through an OR-gate group 209, to output terminals WD0 to WD7.

The ICs 201 and 203 are fed with a clock produced from LT8BO and LTBEN signals by an AND gate 210, and the ICs 202 and 204 are fed with a clock produced from LT8BO and LTBEN signals by an AND gate 211 that receives the LTBEN signal after inverting it.

First, while the ICs 201 and 203 are performing latching operation, the ICs 202 and 204 output the data latched in themselves; by contrast, while the ICs 202 and 204 are performing latching operation, the ICs 201 and 203 output the data latched in themselves. Note that, in reality, there are three more ICs (not shown) that are connected to SD0 to SD7 and operate in the same way as the IC 2011; similarly, also for each of the ICs 202, 203, and 204, there are three more ICs (not shown) that operate in the same way as they do.

Next, when 32 bits of image data are latched in the 32-bit latch circuit 87*a* composed of the IC 201 and the three other ICs (not shown), those 32 bits of image data are outputted parallel to be written to the DRAMs. The ICs 202, 203, and 204 operate in the same way.

While the 32-bit latch circuit is performing the above operation, the ICs 201, 202, 203, and 204 are supplied with "1" at their clear terminal CLRN, and accordingly they latch and output the input image data. When the screen is filled with black color, however, the ICs 201, 202, 203, and 204 are supplied with "0" at their clear is terminal CLRN, and thereby they are cleared. In their cleared state, all of the ICs 201, 202, 203, and 204 output "0" regardless of the color of the input image data.

A location in the DRAMs is identified with an address that consists of a nine-bit RAS address and a nine-bit CAS address. Of the RAS address bits, all nine bits are used as a row address (accordingly, it is possible to count up to 512; actually, 384 rows need to be identified at most); of the CAS address bits, one bit is used to identify the principal and auxiliary pictures, one bit is used to identify the upper and lower screens, and the remaining seven bits are used as a column address (accordingly, it is possible to count up to 128; actually, 96 column-blocks need to be identified at most, assuming that one column-block corresponds to 32 bits of data written to the DRAMs at a time). This addressing method contributes to the reduction of access time, because it allows, within a row of pixels, specific locations to be accessed by page addressing, that is, without changing the RAS address.

The image data written to the DRAMs 91 to 94 as described above are processed (read out) for display through the following operations. The image data read from the DRAMs 91 to 94 is latched by 32-bit latch circuits 98 to 101 provided for read operation. In read operation, a location in the DRAMs is identified with an address that is controlled by a circuit 97, and this address, unlike an address for write operation, always starts at row 0 and column 0. Since the numbers of columns and rows constituting the screen differ between XGA-type LCD panels and SVGA-type LCD panels, two sets of fixed numbers are stored in an LCD panel so that the appropriate set of numbers can be selected by checking whether the input pin of the controller 2 is in the state of "0" or "1".

More specifically, first, 32 bits of image data for the upper screen are read from the DRAMs and are latched by the 32-bit latch circuit 98. Next, 32 bits of image data for the lower screen are read from the DRAMs and are latched by the 32-bit latch circuit 100. There are four 32-bit latch circuits in total for read operation, of which two are for the upper screen and two are for the lower screen. In FIG. 2, the 32-bit latch circuits 98 and 99 are for the upper screen, and the 32-bit latch circuits 100 and 101 are for the lower screen. When the reading of 32 bits of image data for both of the upper and lower screens is completed, the 32-bit latch circuits 98 and 100 each output the latched data in four steps, outputting eight bits in each step.

While the 32-bit latch circuits 98 and 100 are outputting the latched data eight bits at a time, the other 32-bit latch circuits 99 and 101 each latch the next 32 bits of image data. In this way, the 32-bit latch circuits 98 and 100 on one hand, and the 32-bit latch circuits 99 and 101 on the other are used alternately to feed image data sequentially to both of the upper and lower screens simultaneously. The intervals at which the DRAMs are read are defined by, and thus set equal to, the speed at which image data is fed to the LCD module 11.

By reading image data for the upper and lower screens simultaneously, it is possible to increase the access speed, because then, just as in write operation, specific locations in the DRAMs can be accessed by page addressing, that is, by changing only the CAS address. Every time the reading of image data for one row of pixels is completed, the $H_{SYNC}$ pulse, which is generated at regular intervals, causes a line feed, and thereby the reading of image data for the next row is started. At this time, if the row address is not incremented, image data for one row of pixels is read twice and is duplicated in two rows of pixels. Thus, enlargement of images in the vertical direction is achieved by such duplication of rows when image data is read from the DRAMs. Eventually, during the former half of one vertical interval (the interval from one $V_{SYNC}$ pulse to the next), the image data for the principal picture is displayed, and, during the latter half, the image data for the auxiliary picture is displayed.

The image data outputted eight bits at a time from the 32-bit latch circuits 98 to 101 is fed to a converter 102 for the upper screen and a converter 103 for the lower screen. These converters 102 and 103 output the received image data intact to the LCD module, if the LCD module is of the SVGA type having an eight-bit interface, or output the received image data to the LCD module while rearranging three sets of eight-bit data into two sets of 12-bit data, if the LCD module is of the XGA-type having a 12-bit interface. The two converters 102 and 103 operate simultaneously. The LCD module is further supplied with signals such as latching signals and line-feed signals that are generated by an LCD signal generating circuit 104.

The DRAMs are connected to the controller 2 through two buses, of which, at a time, one is used for writing data to the DRAMs and the other is used for reading data therefrom. Which bus is used for writing or reading is toggled on every occurrence of the $V_{SYNC}$ pulse by a DRAM bus control circuit 90. The image data written to the DRAMs during one vertical interval is read out and displayed during the next vertical interval.

When the LCD apparatus starts receiving supply of power, or when the video mode (XGA, SVGA, or VGA) of the input video signal changes, the CPU1 first turns the LCD module 11 off, then sets various display parameters, and thereafter turns the LCD module on.

The CPU 1 sets the display parameters in the following manner. First, from the frequencies and polarities of the $V_{SYNC}$ and $H_{SYNC}$ signals included in the input video signal fed from a personal computer or other, the CPU 1 identifies the video mode (XGA, SVGA, or VGA) of the input video signal. Moreover, the CPU 1 refers to the memory 8 to identify the display mode (black filling, blue filling, enlarged display, or normal display) selected on the operation unit 300 of the LCD apparatus.

Next, in accordance with the identified display mode, the CPU 1 sets the numbers to be counted by the counters A, B, C, D, and H, inverts the polarities of the synchronizing signals $V_{SYNC}$ and $H_{SYNC}$ if necessary (to keep the polarities of these signals consistent), divides the input image signal interval into equal blocks (768, 600, or 480 equal blocks) to form internal $H_{SYNC}$ pulses for DRAM read operation, sets the frequency of the dot clocks, sets the enlargement factor suitable for the selected display mode, enables black or blue filling, and makes other settings.

When the operation unit 300 is operated to change the display mode (black filling, blue filling, enlarged display, and normal display), the CPU 1 recognizes it by comparing the resulting change of the parameters with the data stored in the memory 8. Also in this case, the CUP 1 first turns the LCD module 11 off, then sets the parameters in the manner described above, and thereafter turns the LCD module 11 on again. The purpose of turning the LCD module off during the setting of the parameters is to prevent disturbed images from being displayed during that period, and to protect the LCD module against possible damage resulting from the temporary absence of the drive signals.

Figure 14:
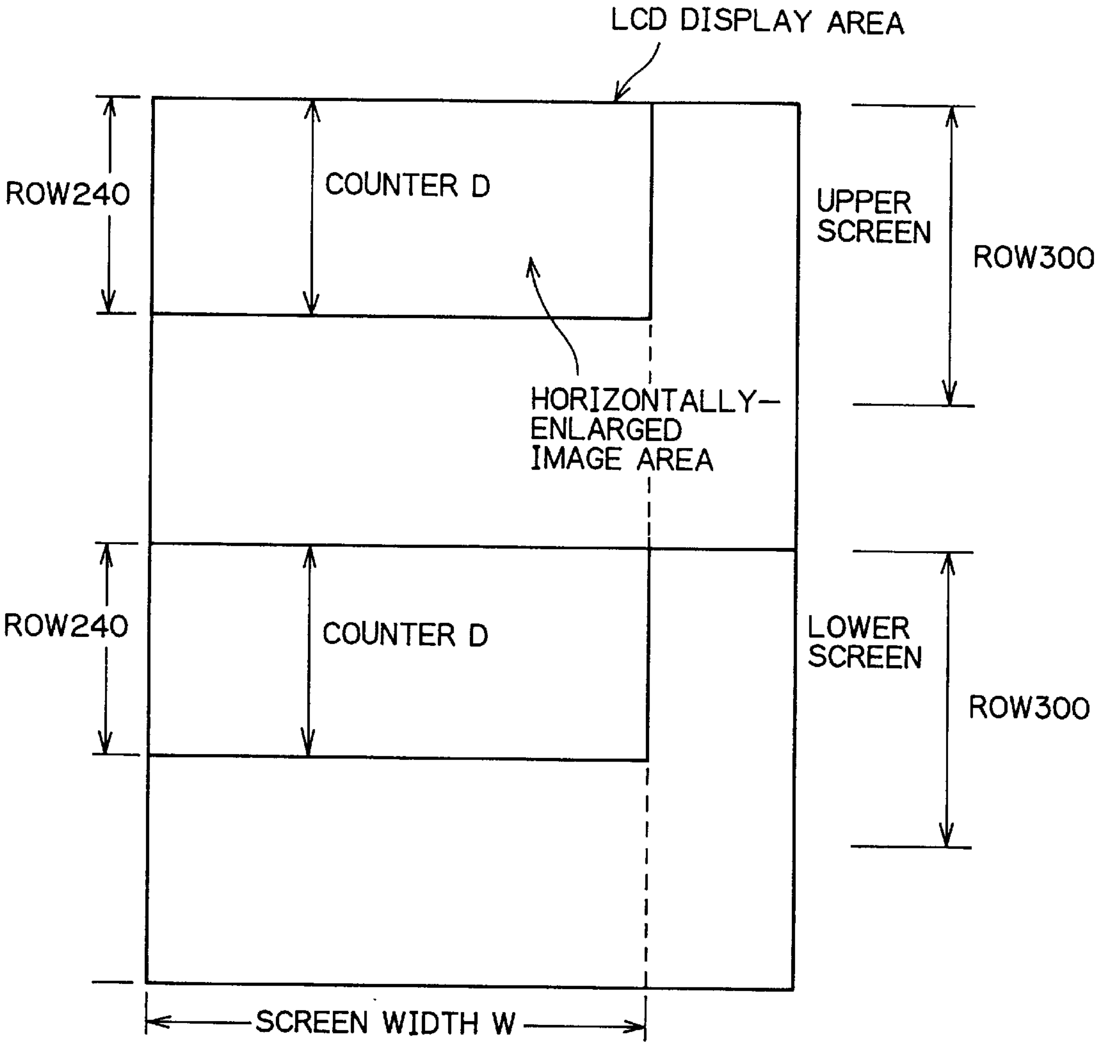
FIG. 14 is a diagram showing how image data is written to DRAMs when images are enlarged.

To sum up, in the embodiment under discussion, enlargement of displayed images and filling of the screen with a particular color are processed as follows. To enlarge displayed images, first, images are enlarged in the horizontal direction by appropriately controlling the latching signals with which the 24-bit latch circuits 81*a* and 81*b* perform latching operation. The image data thus enlarged horizontally by the 24-bit latch circuits is written to the DRAMs 91 to 94. Next, when the image data written to the DRAMs is read out for display on the LCD module 11, the images are enlarged in the vertical direction by reading some of the lines (rows of pixels) constituting the images more than once. FIG. 14 schematically shows how image data is written to DRAMs when images are enlarged. As shown in FIG. 14, in this case, neither the portion of the DRAMs for the upper screen nor the portion for the lower screen contains enough image data to fill all rows of pixels on the actual upper and lower screens. However, this deficiency of image data is compensated for by reading some of the lines constituting the images twice.

To fill the screen with blue color, the clear terminals of the 24-bit latch circuits are kept at a predetermined value by the operation of a blue-fill control circuit 83. On the other hand, to fill the screen with black color, predetermined input terminals of the 32-bit latch circuits 87*a*, 87*b*, 88*a*, and 88*b* are kept at predetermined values by the operation of a black-fill control circuit 80 in such a way that these latch circuits are kept in a cleared state.

In the embodiment under discussion, it is assumed that the input video signal has a frequency of 60 Hz, and accordingly the screen is refreshed at 1/120-second intervals. However, the input video signal may have a frequency other than 60 Hz. For example, if the input video signal has a frequency of 70 Hz, the screen is refreshed at 1/140-second intervals. To generalize, if the input video signal has a vertical frequency f, then the screen is refreshed every ½f-second intervals.

Figure 15A:
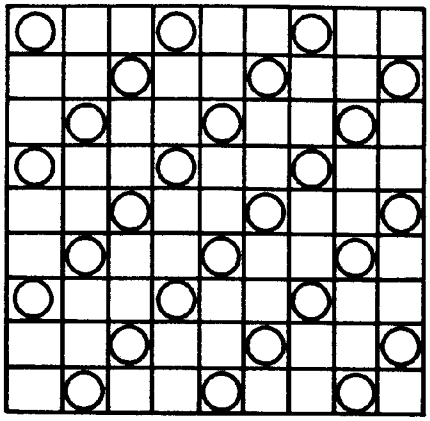
FIGS. 15A and 15B are diagrams showing other examples of the dithering patterns of which one is shown in FIG. 6.
Figure 15B:
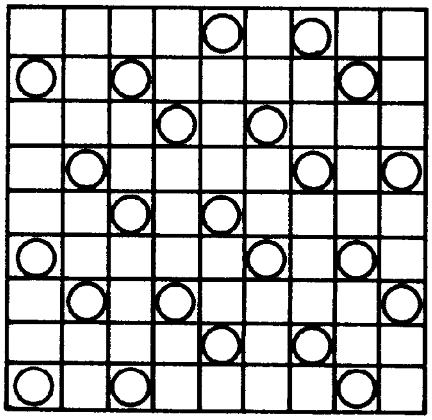

Moreover, as described earlier, the controller 2 uses different dithering patterns in accordance with the levels of the image signals outputted from the A/D converters 4 (see FIG. 1) to reproduce different shades of color. For example, of the 16 shades of color that can be reproduced (hereinafter referred to as the grade-0 to grade-15 shades), the grade-4 shade is reproduced with a dithering pattern as shown in FIG. 15A; this dithering pattern consists of 3×3-pixel blocks of an identical pattern, and thus causes ⅓ of the pixels to be turned on. On the other hand, the grade-3 shade is reproduced with a dithering pattern as shown in FIG. 15B; this dithering pattern consists of 7×7-pixel blocks of an identical pattern, and thus causes 2/7 of the pixels to be turned on.

Figure 16:
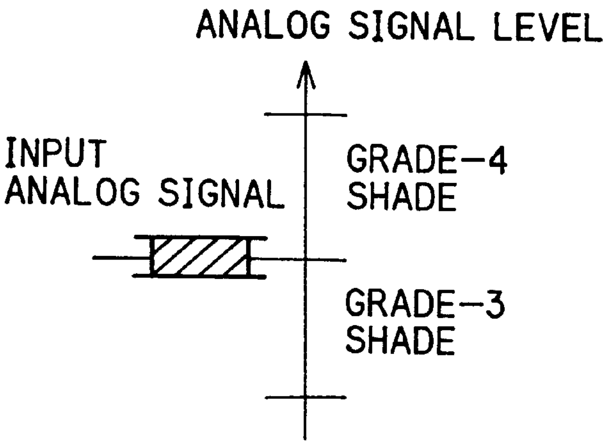
FIG. 16 is a diagram showing the relationship between the level of an analog image signal and the shades of color.

However, when, as shown in FIG. 16, the A/D converters 4 receive an analog image signal whose level is close to the border between the level range for the grade-4 shade and the level range for the grade-3 shade, the A/D converters 4 output signals corresponding to the grade-3 and grade-4 shades in a randomly mixed way, because the level of the analog image signal varies within a continuous range of 20 mV. As a result, the dithering patterns for the grade-3 and grade-4 shades are displayed in a randomly mixed way, and therefore, as long as the dithering patterns shown in FIGS. 15A and 15B are used, the screen looks noisy when the displayed images include intermediate shades of color.

Figure 17:
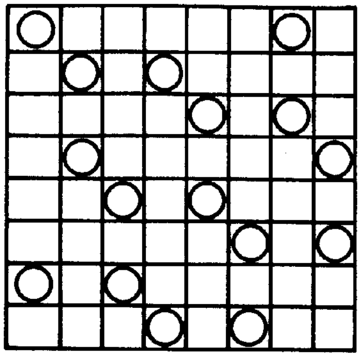
FIG. 17 is a diagram showing another example of the dithering pattern for the third shade.

This can be prevented by changing the dithering patterns as follows. The dithering pattern for the grade-3 shade is changed to a pattern as shown in FIG. 17. This dithering pattern consists of 8×8-pixel blocks of an identical pattern, and thus causes 2/8 of the pixels to be turned on. In the figure, a hollow circle (○) represents a pixel which is turned on. In this dithering pattern, each row and column of each block contains the same number of "on" pixels, and, every time the screen is refreshed, the overall pattern of "on" pixels is shifted one line upward.

Figure 18A:
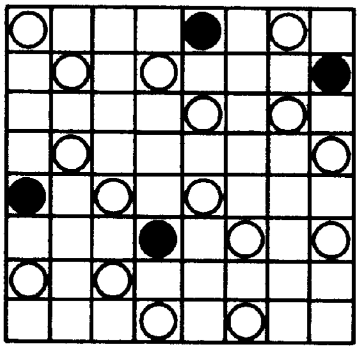
FIGS. 18A to 18D are diagrams showing other examples of the dithering pattern for the fourth shade.

On the other hand, the dithering pattern for the grade-4 shade is changed to a pattern as shown in FIG. 18A. In this dithering pattern, as compared with the dithering pattern for the grade-3 shade, four more pixels (represented by solid circles (●) per block are additionally turned on, causing 5/16 of the pixels in total to be turned on. However, in this dithering pattern, within a block, some columns contain a different number of "on" pixels from the others, and accordingly, when this dithering pattern is shifted one line upward every time the screen is refreshed, an undesirable pattern (noise) appears in the displayed image.

Figure 18B:
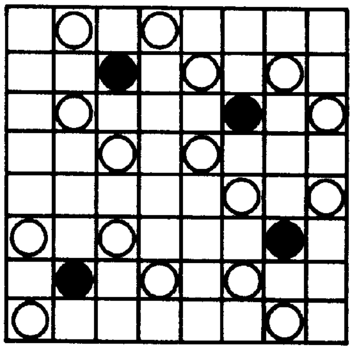

To prevent this, in the LCD apparatus of the present invention, the grade-4 shade is reproduced, for the first picture, with the dithering pattern shown in FIG. 18 A, and for the second picture, with a dithering pattern as shown in FIG. 18B, for example. The dithering pattern shown in FIG. 18B also causes 5/16 of the pixels to be turned on, but, here, the distribution of "on" pixels among the columns is just opposite as compared with the dithering pattern shown in FIG. 18A. Then, for the third picture, a dithering pattern obtained by shifting the dithering pattern shown in FIG. 18A two lines upward is used, and for the fourth picture, a dithering pattern obtained by shifting the dithering pattern shown in FIG. 18B two lines upward is used. In this way, every time the picture is refreshed, a different dithering pattern is used so that the number of "on" pixels in each column will be averaged.

However, the four pixels that are additionally turned on for the grade-4 shade shift two lines upward at a time as the refreshing of the screen proceeds, and therefore some rows contain a different number of "on" pixels from the others. As a result, a pattern that is not included in the displayed images appears on the screen.

Figure 18C:
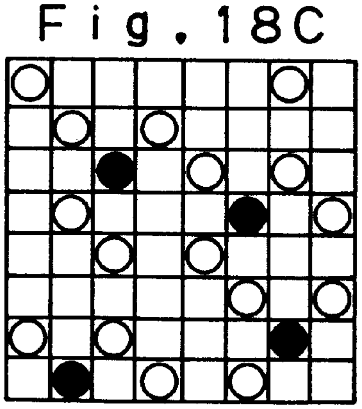
Figure 18D:
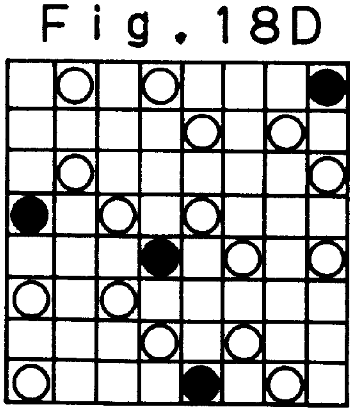

To prevent this, for the first to eighth pictures, the dithering patterns shown in FIGS. 18A and 18B are used, and, for the ninth to sixteenth pictures, dithering patterns as shown in FIGS. 18C and 18D are used. For the seventeenth and succeeding pictures, the dithering patterns used for the first to sixteenth pictures are repeatedly used.

The dithering patterns shown in FIGS. 18C and 18D are so configured as to cancel out the uneven distribution of "on" pixels with respect to both the columns and the rows that is caused by the dithering patterns shown in FIGS. 18A and 18B. Note that the patterns shown in FIGS. 18A and 18C are for odd-numbered pictures, and the patterns shown in FIGS. 18B and 18D are for even-numbered pictures. In this way, "on" pixels are distributed evenly with respect to the columns and the rows, and thus it is possible to achieve smooth display of images.

As described above, for the grade-4 shade, four different dithering patterns are used, and all of those patterns consist of pixel blocks of the same size as the pixel blocks composing the dithering pattern for the grade-3 shade. As a result, even if the A/D converters 4 output signals corresponding to the grade-3 and grade-4 shades in a randomly mixed way, since any pattern for the grade-4 shade differs from the pattern for the grade-3 shade only in the additional four "on" pixels, fewer pixels are randomly turned on and off as compared with the patterns shown in FIGS. 15A, 15B, and 17. Thus, it is possible to reduce considerably the noise appearing on the screen. Note that the way the four dithering patterns are switched may be modified in accordance with, for example, the frequency of the input video signal.

For the grade-0 shade, all the pixels are turned off. For the grade-1 shade, ⅛ of the pixels are turned on by the use of a dithering pattern consisting of 8×8-pixel blocks. For each higher grade of shades, four more pixels per block are additionally turned on. Accordingly, for the grade-15 shade, all the pixels are turned on. Note that, for those grades which require th at an odd number of pixels out of 16, for example 5/16 of the pixels, be turned on, it is necessary to use four different dithering patterns to prevent the appearance of an undesirable pattern on the screen as mentioned above.

Figure 19:
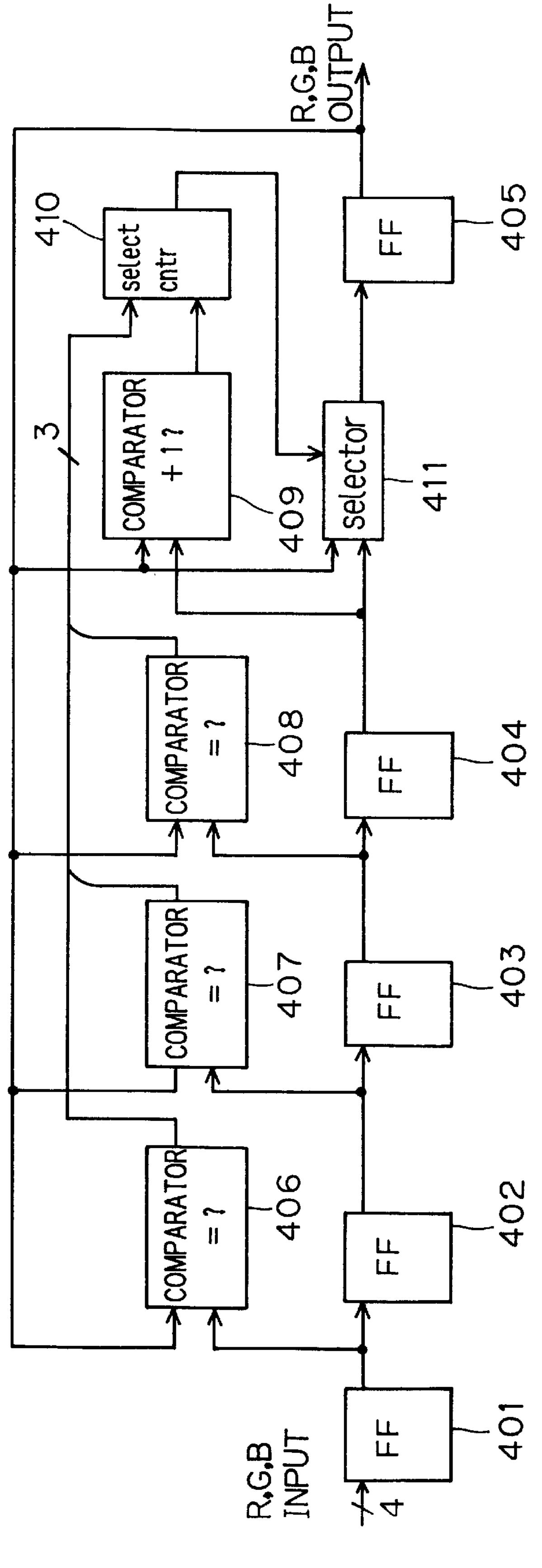
FIG. 19 is a block diagram of the circuit for processing shades-of-color data

To further reduce the noise in the displayed images, the noise included in the image signals is reduced by the use of a circuit as shown in FIG. 19. This circuit achieves reduction of noise by processing image data in consideration of hysteresis. In all, six of this noise-reduction circuit are provided at the input side of the even/odd control circuit 61 (see FIG. 2), one for each of the R, G, and B signals for odd-numbered pixels and those for even-numbered pixels.

In FIG. 19, for each of the four-bit R, G, and B signals, a block of image data constituting four pixels is latched by four-bit D flip-flops 401 to 404 at a time. For odd-numbered bits, the flip-flops 401 to 404 are supplied with the dot clock DCLKO at their clock terminal (not shown), and, for even-numbered bits, the flip-flops 401 to 404 are supplied with the dot clock DCLKE at their clock terminal.

A block of image data fed to the noise-reduction circuits is first latched by the flip-flop 401. Then, in synchronism with the dot clock, the flip-flop 402 latches the data latched in the flip-flop 401 and the flip-flop 401 latches the next block of image data. The flip-flops 403 and 404 operate in the same way, so that a sequence of image data is latched block by block by one flip-flop after another.

The image data outputted from the flip-flop 404 is fed to a selector 411. The selector 411 feeds its output to a four-bit D flip-flop 405. The flip-flop 405 also receives at its clock terminal the dot clock DCLKO, for odd-numbered pixels, or the dot clock DCLKE, for even-numbered pixels. The flip-flop 405 feeds its output to the even/odd control circuit 61 shown in FIG. 2. In addition, the output of the flip-flop 405 is connected to a second input of the selector 411.

A comparator 409 checks whether the data latched in the flip-flop 404 is greater by one than the data latched in the flip-flop 405 (i.e. a one-grade rise in shades of color is about to occur). Moreover, comparators 406 to 408 check whether the data latched in the flip-flops 401 to 403, respectively, is equal to the data latched in the flip-flop 405. The results of the comparison performed by these comparators 406 to 409 are fed to a select control circuit 410.

On the basis of the comparison results, if the data in the flip-flop 404 is greater by one than the data in the flip-flop 405 and, in addition, the data in any of the flip-flops 401 to 403 is equal to the data in the flip-flop 405, then the select control circuit 410 controls the selector 411 in such a way that the data in the flip-flop 404 is discarded and the data in the flip-flop 405 is fed to the flip-flop 405 again. Otherwise, the select control circuit 410 controls the selector 411 in such a way that the data in the flip-flop 404 is fed through the selector 411 to the flip-flop 405.

Figure 20:
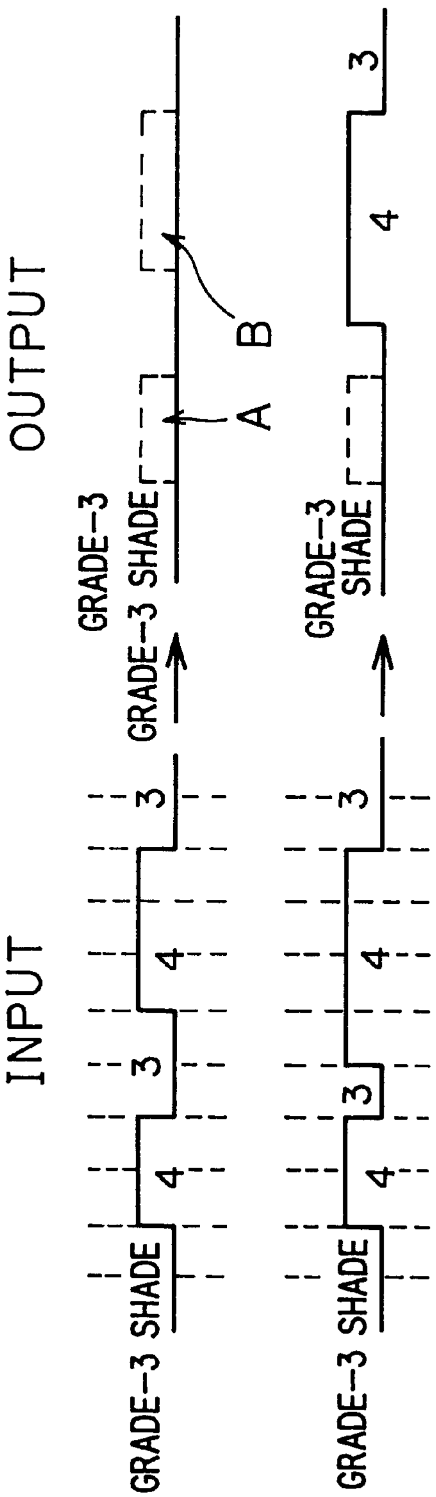
FIG. 20 is a diagram showing how the shades-of-color data processing circuit operates.

As a result, as shown at (a) in FIG. 20, even when image data for the grade-4 shade is received while a sequence of image data for the grade-3 shade is being received, the image data for the grade-4 shade is ignored unless it continues longer than the duration corresponding to three pixels, as indicated by arrows A and B. On the other hand, as shown at (b) in FIG. 20, when image data for the grade-4 shade is received longer than the duration corresponding to three pixels while a sequence of image data for the grade-3 shade is being received, the image data for the grade-4 shade is not ignored but is fed to the even/odd control circuit 61. Also in cases other than when the data in the flip-flop 404 is greater by one than the data in the flip-flop 405, that is, for example, if the former is smaller by one than the latter (i.e. a one-grade drop in shades of color), or if the former is greater by two than the latter (i.e. a two-grade rise in shades of color), the output of the flip-flop 404 is fed through the selector 411 to the flip-flop 405.

As described above, even if the level of an input analog image signal is close to the border between the level range for the grade-3 shade and the level range for the grade-4 shade, and thus the A/D converters 4 output signals corresponding to the grade-3 and grade-4 shades in a randomly mixed way, the signals corresponding to the grade-4 shade are ignored so that the grade-3 shade will be obtained uniformly. In this way, the noise included in the image signals is reduced. Note that this noise reduction is valid for other grades of shades as well. Note also that the circuit shown in FIG. 19 serves to reduce the noise in the image signals and thus to obtain smooth display of images even in cases where the dithering patterns for different shades of color consist of pixel blocks of different sizes.

Next, a description will be given of a modified version of the circuit shown in FIG. 19. In the embodiment under discussion, the A/D converters 4 output six-bit signals. However, of the six bits composing each signal, only the upper four bits are used when the signals, which represent shades of color, are fed to the circuit shown in FIG. 19. By using the remaining two lower bits, it is possible to assign four different sets of data to one shade of color. To achieve this, in the modified noise-reduction circuit, the flip-flops 401 to 405 are realized with six-bit D flip-flops so that all six bits of each signal can be latched.

Correspondingly, the comparators 406 to 408 compare the six-bit data outputted from the flip-flops 401 to 403, respectively, with the six-bit data latched in the flip-flop 405. On the other hand, the comparator 409 calculates the difference between the data in the flip-flop 404 and the data in the flip-flop 405 to check whether the data in the flip-flop 404 indicates a one-grade rise in shades of color relative to the data in the flip-flop 405.

If the data in the flip-flop 404 indicates a rise smaller than a one-grade rise in shades of color relative to the data in the flip-flop 405, and, in addition, the data in the flip-flop 405 is equal to the data of at least one of the flip-flops 401 to 403, then the select control circuit 410 discards the data in the flip-flop 404 and feeds the data in the flip-flop 405 to the flip-flop 405 again. Otherwise, the select control circuit 410 feeds the data outputted from the flip-flop 404 to the flip-flop 405.

Figure 21:
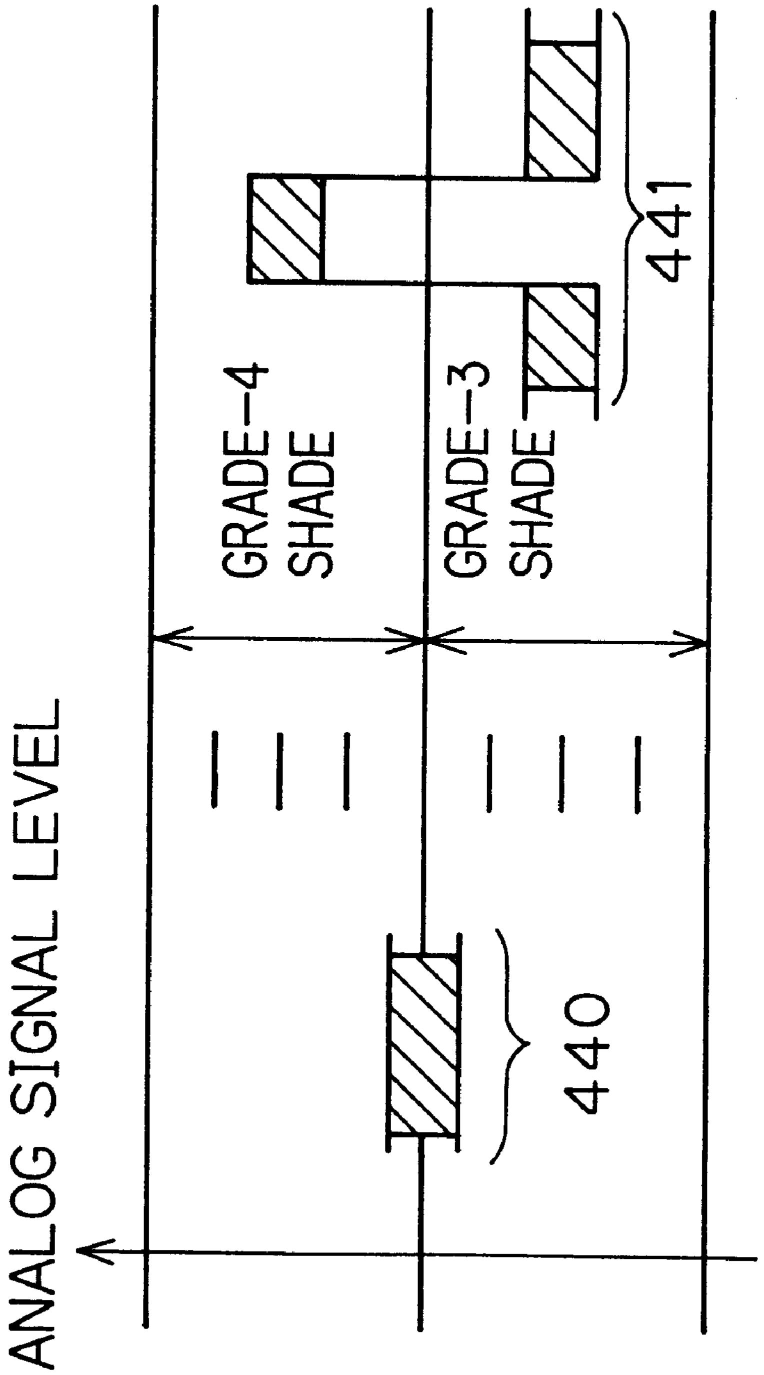
FIG. 21 is a diagram showing how the image signals and shades-of-color data are processed by the shades-of-color data processing circuit.

As a result, when, as indicated by numeral 440 in FIG. 21, the A/D converters 4 receive an analog image signal whose level is close to the border between the level ranges for the grade-3 and grade-4 shades, and thus the A/D converters 4 output signals corresponding to the two grades of shades in a randomly mixed way, then the signals for the grade-4 shade are ignored as described above.

Note that, as indicated by numeral 441, when the A/D converters 4 output signals corresponding to the grade-3 and grade-4 shades in a randomly mixed way, this does not always mean that the level of the input analog image signal is close to the border between the level ranges for the two grades of shades. For example, it is possible that, while a sequence of image data for the grade-3 shade is being received, the six bits of the image data "001110" may momentarily change to "010010" and then return back to "001110". In such a case, even if the A/D converters 4 output signals corresponding to the grade-3 and grade-4 shades in a mixed way, they are not mixed randomly, because the input analog image signal fed to the A/D converters 4 exhibits a distinct change from one shade to another.

Since the comparators 406 to 409 perform comparison operations by using all six bits of the image data, the select control circuit 410 can check whether a rise in the level of the input analog image signal corresponds to a one-grade rise in shades of color, and, if so, the select control circuit 410 does not discard the signals for the grade-4 shade. As a result, even when the A/D converter output signals corresponding to the grade-3 and grade-4 shades in a mixed way, the signals for the grade-4 shade are not ignored, unless they are found to be due to a variation in the level of the input analog image signal. However, if the signals for the grade-4 shade are found to be due to a variation in the level of the input analog image signal, they are ignored, and thus the noise in the image signals is reduced.

As described above, in the LCD apparatus according to the present invention, once data of a particular color is written to a memory in such a way that the entire screen of the LCD module is filled with that color, thereafter it is only necessary to refresh the data in the memory in accordance with input image data. Accordingly, it is not necessary to rewrite the entire screen including blank areas every time the screen (frame) is refreshed. Thus, as compared with conventional LCD apparatus that rewrite the entire screen including blank areas every time the screen is refreshed, the LCD apparatus according to the present invention can be realized with simpler circuits and simpler processing operations.

Moreover, in the LCD apparatus according to the present invention, displayed images can be enlarged in the horizontal direction simply by making latch circuits latch input image data in such a way that the image data for one line (row of pixels) is uniformly distributed over the actual number of pixels in a line. Thus, enlargement of displayed images can be achieved easily.

Moreover, in the LCD apparatus according to the present invention, shades of color can be reproduced, and picture-by-picture output of dithering patterns can be easily performed in accordance with the shades of color of input image data.

Moreover, in the LCD apparatus according to the present invention, the screen is refreshed at ½f-second intervals (f represents the vertical frequency of the input video signal). Accordingly, as compared with conventional LCD apparatus, the screen is refreshed twice as many times per unit time, and thus flickers on the screen are less noticeable.

Moreover, in the LCD apparatus according to the present invention, the picture-by-picture change of a dithering pattern is achieved by the use of regularly recurring patterns, and thus can be processed easily.

Furthermore, in the LCD apparatus according to the present invention, it is possible to prevent displayed images from being disturbed by display-mode setting operations.

What is claimed is:

1. An LCD apparatus comprising:

a pattern generating circuit for generating a dithering pattern for each of a plurality of shades of color in such a way that the dithering pattern is changed every time an LCD screen of the LCD apparatus is refreshed;

a detecting circuit for detecting a shade of color of input image data; and a selecting circuit for selecting, in accordance with an output of the detecting circuit, one of the dithering patterns generating by the pattern generating circuit, wherein images are displayed on the LCD screen by use of the dithering pattern selected by the selecting circuit, and the LCD screen is refreshed every ½ f second by preparing data for two screens for each pixel and displaying the data of those two screens within a period for displaying one screen, thereby reducing the effect of flickers on the LCD screen, where f represents a vertical frequency of an input video signal.

2. An LCD apparatus as claimed in claim 1, wherein the changing of the dithering pattern is achieved by shifting the dithering pattern a predetermined number of bits upward or downward every time the LCD screen of the LCD apparatus is refreshed.

3. An LCD apparatus as claimed in claim 1, wherein dithering patterns for different shades of color consist of basic pixel patterns that are identical in size for all shades of color but are different in number of pixels turned on for different shades of color.

* * * * *